(12) United States Patent
Yamagata et al.

(10) Patent No.: US 10,239,964 B2
(45) Date of Patent: Mar. 26, 2019

(54) METHOD FOR MANUFACTURING CONJUGATED DIENE POLYMER, CONJUGATED DIENE POLYMER, RUBBER COMPOSITION, AND TIRE

(71) Applicant: BRIDGESTONE CORPORATION, Tokyo (JP)

(72) Inventors: Yusuke Yamagata, Tokyo (JP); Narukuni Hirata, Tokyo (JP); Tomoe Tanabe, Tokyo (JP); Shojiro Kaita, Tokyo (JP); Madoka Kimura, Kawasaki (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/502,882

(22) PCT Filed: Jul. 2, 2015

(86) PCT No.: PCT/JP2015/003349
§ 371 (c)(1),
(2) Date: Feb. 9, 2017

(87) PCT Pub. No.: WO2016/027402
PCT Pub. Date: Feb. 25, 2016

(65) Prior Publication Data
US 2017/0233504 A1    Aug. 17, 2017

(30) Foreign Application Priority Data

Aug. 20, 2014  (JP) ................. 2014-167727
Aug. 20, 2014  (JP) ................. 2014-167777
Aug. 20, 2014  (JP) ................. 2014-167782

(51) Int. Cl.
| | |
|---|---|
| C08F 4/54 | (2006.01) |
| C08F 236/06 | (2006.01) |
| C08F 236/08 | (2006.01) |
| B60C 1/00 | (2006.01) |
| C08F 136/04 | (2006.01) |
| C08L 9/00 | (2006.01) |
| C08F 136/06 | (2006.01) |
| C08F 136/08 | (2006.01) |

(52) U.S. Cl.
CPC ............. C08F 4/545 (2013.01); B60C 1/00 (2013.01); C08F 4/54 (2013.01); C08F 136/04 (2013.01); C08F 136/06 (2013.01); C08F 136/08 (2013.01); C08F 236/06 (2013.01); C08F 236/08 (2013.01); C08L 9/00 (2013.01)

(58) Field of Classification Search
CPC ....... C08F 4/545; C08F 236/06; C08F 236/08
See application file for complete search history.

(56) References Cited

U.S. PATENT DOCUMENTS

| | | | |
|---|---|---|---|
| 4,942,147 A | 7/1990 | Karol et al. | |
| 6,383,971 B1 * | 5/2002 | Windisch ............... | C08F 4/54 |
| | | | 502/103 |
| 6,399,726 B1 | 6/2002 | Windisch et al. | |
| 2003/0212220 A1 | 11/2003 | Laubry | |
| 2009/0253869 A1 | 10/2009 | Smale et al. | |
| 2015/0197630 A1 | 7/2015 | Tamaki et al. | |

FOREIGN PATENT DOCUMENTS

| | | |
|---|---|---|
| CA | 2 372 178 A1 | 11/2000 |
| CN | 1350560 A | 5/2002 |
| CN | 101914183 A | 12/2010 |
| CN | 101914183 B | 8/2012 |
| DE | 19832446 A1 | 1/2000 |
| EP | 2 857 422 A1 | 4/2015 |
| EP | 2873681 A1 | 5/2015 |
| JP | 03-094833 A | 4/1991 |
| JP | 2001-114809 A | 4/2001 |
| JP | 2002-544350 A | 12/2002 |
| JP | 2004-027179 A | 1/2004 |
| JP | 2004-515617 A | 5/2004 |
| JP | 2010-285550 A | 12/2010 |
| JP | 2011-068711 A | 4/2011 |
| JP | 2011-516689 A | 5/2011 |
| JP | 2013-035981 A | 2/2013 |
| JP | 2013-053212 A | 3/2013 |
| JP | 2013-053213 A | 3/2013 |
| JP | 2013-216850 A | 10/2013 |
| JP | 2014-019732 A | 2/2014 |
| RU | 2505553 C2 | 1/2014 |
| WO | 2013/179651 A1 | 12/2013 |
| WO | 2014/010248 A1 | 1/2014 |

OTHER PUBLICATIONS

Communication dated Dec. 27, 2017 issued by the Russian Federal Service for Intellectual Property in counterpart Russian Application No. 2017108787/04.
International Search Report for PCT/JP2015/003349 and dated Oct. 6, 2015 [PCT/ISA/210].
Communication dated Aug. 21, 2018 from the State Intellectual Property Office of the P.R.C. in counterpart Application No. 201580044464.5.

* cited by examiner

*Primary Examiner* — Caixia Lu
(74) *Attorney, Agent, or Firm* — Sughrue Mion, PLLC

(57) ABSTRACT

A method for manufacturing a conjugated diene polymer that can increase the robustness of a polymerization reaction system is provided. Also, a conjugated diene polymer, with a high cis-1,4-bond content, that is manufactured by this method for manufacturing is provided. A method for manufacturing a conjugated diene polymer includes polymerizing a conjugated diene monomer using a polymerization catalyst composition including a rare earth element compound and a compound having a cyclopentadiene skeleton, and a conjugated diene polymer manufactured with this method for manufacturing has a cis-1,4-bond content of 95% or greater.

10 Claims, No Drawings

METHOD FOR MANUFACTURING CONJUGATED DIENE POLYMER, CONJUGATED DIENE POLYMER, RUBBER COMPOSITION, AND TIRE

CROSS REFERENCE TO RELATED APPLICATIONS

This application is a National Stage of International Application No. PCT/JP2015/003349 filed Jul. 2, 2015, claiming priority based on Japanese Patent Application Nos. 2014-167782 filed Aug. 20, 2014, 2014-167727 filed Aug. 20, 2014, and 2014-167777 filed Aug. 20, 2014, the contents of all of which are incorporated herein by reference in their entirety.

TECHNICAL FIELD

This disclosure relates to a method for manufacturing a conjugated diene polymer, a conjugated diene polymer, a rubber composition, and a tire.

BACKGROUND

Rubber products, such as tires, are required to have excellent breaking resistance, wear resistance, crack growth resistance, and the like. Therefore, the use of natural rubber with excellent elasticity as the raw material for rubber products is known. In recent years, due to the decrease in rubber tree resources, the price of natural rubber has risen. Hence, synthetic rubber that has characteristics equivalent to those of natural rubber is necessary.

Natural rubber is substantially composed of polyisoprene having nearly 100% cis-1,4-bond content, and it is thought that the molecular structure of this polymer produces elasticity. Based on this knowledge of natural rubber, active research is being conducted on conjugated diene polymers having a high cis-1,4-bond content and on methods for manufacturing such conjugated diene polymers.

A method using a catalyst formed by a metallocene-type cationic complex of a gadolinium compound as a main catalyst is a known method for manufacturing a conjugated diene polymer having a high cis-1,4-bond content (see JP 2004-027179 A (PTL 1)). In the aforementioned method for manufacturing, a boron compound, an aluminoxane compound (in particular, PMMAO), or the like are also used as co-catalysts.

CITATION LIST

Patent Literature

PTL 1: JP 2004-027179 A

SUMMARY

Technical Problem

In the aforementioned known method for manufacturing a conjugated diene polymer, however, in order to dissolve the compound of the main catalyst of the polymerization catalyst composition that is used, an aromatic hydrocarbon (such as toluene), which is poisonous and relatively expensive, has been necessary as the solvent of the polymerization reaction. Hence, known methods for manufacturing a conjugated diene polymer run the risk of not being able to manufacture a conjugated diene polymer while sufficiently reducing the burden on the environment and manufacturing costs.

Therefore, it would be helpful to provide a method for manufacturing a conjugated diene polymer that can manufacture a conjugated diene polymer while reducing the burden on the environment and manufacturing costs.

It would also be helpful to provide a conjugated diene polymer, with a high cis-1,4-bond content, that is manufactured by this method for manufacturing. Furthermore, it would be helpful to provide a rubber composition including this conjugated diene polymer. It would also be helpful to provide a tire manufactured using this rubber composition.

Solution to Problem

The gist of the present disclosure is as follows.

A method for manufacturing a conjugated diene polymer of this disclosure comprises polymerizing a conjugated diene monomer using a polymerization catalyst composition comprising a rare earth element compound and a compound having at least one cyclopentadiene skeleton selected from the group consisting of substituted or unsubstituted cyclopentadiene, substituted or unsubstituted indene, and substituted or unsubstituted fluorene.

According to the method for manufacturing a conjugated diene polymer of this disclosure, it is not necessary to use an aromatic hydrocarbon, which is poisonous and relatively expensive, as the solvent of the polymerization reaction. Hence, according to the method for manufacturing a conjugated diene polymer of this disclosure, a conjugated diene polymer can be manufactured while reducing the burden on the environment and manufacturing costs.

In the method for manufacturing a conjugated diene polymer of this disclosure, the rare earth element compound is preferably represented by Formula (1)

$$M\text{-}(AQ^1)(AQ^2)(AQ^3) \qquad (1)$$

where M represents at least one element selected from the group consisting of scandium, yttrium, and a lanthanoid element; $AQ^1$, $AQ^2$, and $AQ^3$ are each a different or identical functional group; A represents at least one selected from the group consisting of nitrogen, oxygen, and sulfur; and the rare earth element compound comprises at least one M-A bond.

In the method for manufacturing a conjugated diene polymer of this disclosure, the polymerization catalyst composition preferably further comprises an organometallic compound represented by Formula (2)

$$YR^1_a R^2_b R^3_c \qquad (2)$$

where Y is a metal element selected from the group consisting of Group 1, Group 2, Group 12, and Group 13 of the periodic table; $R^1$ and $R^2$ are each a hydrogen atom or a hydrocarbon group having 1 to 10 carbon atoms; $R^3$ is a hydrocarbon group having 1 to 10 carbon atoms; $R^1$, $R^2$, and $R^3$ are identical to or different from each other; a is 1 and b and c are both 0 when Y is a metal element of Group 1; a and b are 1 and c is 0 when Y is a metal element of Group 2 or Group 12; and a, b, and c are all 1 when Y is a metal element of Group 13. Also, at least one of $R^1$, $R^2$, and $R^3$ is more preferably different.

In the method for manufacturing a conjugated diene polymer of this disclosure, the compound having the cyclopentadiene skeleton is preferably substituted or unsubstituted indene.

In the method for manufacturing a conjugated diene polymer of this disclosure, the polymerization catalyst composition preferably further comprises an aluminoxane compound, and the aluminoxane compound is more preferably MMAO or TMAO.

In the method for manufacturing a conjugated diene polymer of this disclosure, the polymerization catalyst composition more preferably further comprises a halogen compound. The ratio in moles of the halogen compound to the rare earth element compound is preferably from 1.0 to 10.

Furthermore, in the method for manufacturing a conjugated diene polymer of this disclosure, the polymerization catalyst composition preferably does not comprise an aromatic hydrocarbon.

Furthermore, in the method for manufacturing a conjugated diene polymer of this disclosure, the conjugated diene monomer is preferably isoprene and 1,3-butadiene.

A conjugated diene polymer of this disclosure is manufactured with the aforementioned method for manufacturing a conjugated diene polymer, and the cis-1,4-bond content thereof is 95% or greater.

The conjugated diene polymer of this disclosure has an extremely high cis-1,4-bond content. Hence, a conjugated diene polymer with abundant elasticity can be provided.

An isoprene-butadiene block copolymer of this disclosure may be manufactured with the aforementioned method for manufacturing a conjugated diene polymer.

An isoprene-butadiene random copolymer of this disclosure may be manufactured with the aforementioned method for manufacturing a conjugated diene polymer.

A rubber composition of this disclosure includes the aforementioned conjugated diene polymer.

The rubber composition of this disclosure can achieve the effects of the conjugated diene polymer of this disclosure.

A tire of this disclosure is manufactured using the rubber composition.

The tire of this disclosure can achieve the effects of the conjugated diene polymer of this disclosure.

Advantageous Effect

According to the method for manufacturing a conjugated diene polymer of this disclosure, a conjugated diene polymer can be manufactured while reducing the burden on the environment and manufacturing costs. Also, with the conjugated diene polymer of this disclosure, a conjugated diene polymer having an extremely high cis-1,4-bond content can be provided. Furthermore, the rubber composition of this disclosure can achieve the effects of the conjugated diene polymer of this disclosure. Also, the tire of this disclosure can achieve the effects of the conjugated diene polymer of this disclosure.

DETAILED DESCRIPTION

The following describes embodiments of the method for manufacturing a conjugated diene polymer of this disclosure, the conjugated diene polymer of this disclosure, the rubber composition of this disclosure, and the tire of this disclosure in detail with reference to the drawings.

The method for manufacturing a conjugated diene polymer of this disclosure is a method for polymerizing a conjugated diene monomer using a polymerization catalyst composition of an embodiment of this disclosure, the polymerization catalyst composition including a rare earth element compound and a compound having a cyclopentadiene skeleton.

According to the method for manufacturing a conjugated diene polymer of this disclosure, preparation of the polymerization catalyst composition and polymerization of the conjugated diene monomer can be performed in one pot, thereby allowing the process of purifying the catalyst to be omitted and achieving the effects of reducing the manufacturing cost and effectively activating the catalyst.

A known method for manufacturing a conjugated diene polymer uses, as the main catalyst, a catalyst formed by a metallocene-type cationic complex of a gadolinium compound. In order to dissolve the compound of the main catalyst, an aromatic hydrocarbon (such as toluene), which is poisonous and relatively expensive, is necessary as the solvent of the polymerization reaction. Hence, known methods for manufacturing a conjugated diene polymer run the risk of not being able to manufacture a conjugated diene polymer while sufficiently reducing the burden on the environment and manufacturing costs.

The method for manufacturing a conjugated diene polymer of this disclosure uses a rare earth element compound as the main catalyst and uses, as an additive, a compound having a cyclopentadiene skeleton. The main catalyst and additive can be dissolved in a solvent (such as hexane) other than an aromatic hydrocarbon (toluene or the like), and an aromatic hydrocarbon that is poisonous and relatively expensive is not absolutely necessary as the solvent of the polymerization reaction. In other words, the necessity of using of an aromatic hydrocarbon, which is poisonous and relatively expensive, as the solvent of the polymerization reaction can be reduced. Hence, according to the method for manufacturing a conjugated diene polymer of this embodiment, a conjugated diene polymer can be manufactured while reducing the burden on the environment and manufacturing costs.

In the method for manufacturing a conjugated diene polymer according to this embodiment, a compound having a cyclopentadiene skeleton that can function as a conjugated ligand in the reaction system is used as an additive. The compound having a cyclopentadiene skeleton plays the role of improving the catalytic activity in the reaction system. Therefore, according to the method for manufacturing a conjugated diene polymer according to this embodiment, the reaction time required for polymerization can be kept relatively short, and the reaction temperature required for polymerization can be set relatively high, allowing an increase in the robustness of the polymerization reaction system.

(Method for Manufacturing a Conjugated Diene Polymer)

A method for manufacturing an example of a conjugated diene polymer of this disclosure (example method for manufacturing) specifically includes:

a monomer preparation process to prepare a conjugated diene monomer;

a catalyst system preparation process to prepare a polymerization catalyst composition that includes a rare earth element compound and a compound having a cyclopentadiene skeleton (example polymerization catalyst composition); and a polymerization reaction process to polymerize the conjugated diene monomer by mixing the conjugated diene monomer and the polymerization catalyst composition.

—Polymerization Catalyst Composition—

The example of a polymerization catalyst composition of this disclosure (example polymerization catalyst composition) used in the example method for manufacturing a conjugated diene polymer of this disclosure includes a rare earth element compound and a compound having a cyclopentadiene skeleton.

The following describes the example polymerization catalyst composition of this disclosure.

The example polymerization catalyst composition needs to include the following:
a rare earth element compound (component (A)); and
a compound having a cyclopentadiene skeleton (component (B)).

The example polymerization catalyst composition may further include the following:
an organometallic compound (component (C));
an aluminoxane compound (component (D)); and
a halogen compound (component (E)).

The example polymerization catalyst composition preferably has high solubility in aliphatic hydrocarbons and preferably becomes a homogenous solution in aliphatic hydrocarbons. Examples of aliphatic hydrocarbons include hexane, cyclohexane, and pentane.

The example polymerization catalyst composition preferably does not include an aromatic hydrocarbon. Examples of aromatic hydrocarbons include benzene, toluene, and xylene.

Stating "does not include an aromatic hydrocarbon" refers to the ratio of aromatic hydrocarbons included in the polymerization catalyst composition being less than 0.1 wt %.

—Rare Earth Element Compound (Component (A))—

Component (A) may be a rare earth element containing compound that has a metal-nitrogen bond (M-N bond) or the reactants of this rare earth element containing compound and a Lewis base.

Examples of the rare earth element containing compound include compounds containing scandium, yttrium, or a lanthanoid element constituted by an element with an atomic number of 57 to 71. Specifically, the lanthanoid elements are lanthanum, cerium, praseodymium, neodymium, promethium, samarium, europium, gadolinium, terbium, dysprosium, holmium, erbium, thulium, ytterbium, and lutetium.

Examples of the Lewis base include tetrahydrofuran, diethyl ether, dimethylaniline, trimethylphosphine, lithium chloride, neutral olefins, and neutral diolefins.

The rare earth element containing compound or the reactants of this rare earth element containing compound and a Lewis base preferably do not have a bond between the rare earth element and carbon. When the reactants of this rare earth element containing compound and a Lewis base do not have a rare earth element-carbon bond, the reactants are stable and easy to handle.

One type of Component (A) may be used alone, or a combination of two or more types may be used.

Component (A) is preferably a compound represented by Formula (1):

where M represents at least one element selected from the group consisting of scandium, yttrium, and a lanthanoid element; $AQ^1$, $AQ^2$, and $AQ^3$ are each a different or identical functional group; A represents at least one selected from the group consisting of nitrogen, oxygen, and sulfur; and the rare earth element compound comprises at least one M-A bond.

Specifically, the lanthanoid elements are lanthanum, cerium, praseodymium, neodymium, promethium, samarium, europium, gadolinium, terbium, dysprosium, holmium, erbium, thulium, ytterbium, and lutetium.

With the aforementioned compound, the catalytic activity in the reaction system can be improved, the reaction time can be shortened, and the reaction temperature can be increased.

M in Formula (1) is preferably gadolinium in order to increase catalytic activity and controllability of the reaction.

When A in Formula (1) is nitrogen, then examples of the functional group represented by $AQ^1$, $AQ^2$, and $AQ^3$ (i.e. $NQ^1$, $NQ^2$, and $NQ^3$) include amide groups. In this case, the compound has 3 M-N bonds.

Examples of amide groups include an aliphatic amide group such as a dimethyl amide group, diethyl amide group, diisopropyl amide group, and the like; an arylamide group such as a phenyl amide group, 2,6-di-tert-butylphenyl amide group, 2,6-diisopropylphenyl amide group, 2,6-dineobentylphenyl amide group, 2-tert-butyl-6-isopropylphenyl amide group, 2-tert-butyl-6-neobentylphenyl amide group, 2-isopropyl-6-neobentylphenyl amide group, 2,4,6-tert-butylphenyl amide group, and the like; and a bistrialkylsilyl amide group such as a bistrimethylsilyl amide group and the like. In particular, a bistrimethylsilyl amide group is preferable in terms of solubility with respect to aliphatic hydrocarbons and aromatic hydrocarbons. One type of the aforementioned amide groups may be used alone, or a combination of two or more types may be used.

According to this structure, component (A) can be a compound with 3 M-N bonds. Each bond thus becomes chemically equivalent, and the structure of the compound becomes stable, thereby making the compound easy to handle.

Also, the aforementioned configuration further improves the catalytic activity in the reaction system. Therefore, the reaction time can be shortened further, and the reaction temperature can be increased further.

When A is oxygen, then component (A) represented by Formula (1) may be any component, such as a rare earth alcoholate represented by Formula (1a) below:

or a rare earth carboxylate represented by Formula (1b) below:

Each R in Formulas (1a) and (1b) is an alkyl group having 1 to 10 carbon atoms and may be the same or different.

As component (A), a compound not having a bond between a rare earth element and carbon is preferable. Therefore, the above-described compound (I1a) or compound (I1b) may be suitably used.

When A is sulfur, then component (A) represented by Formula (1) may be any component, such as a rare earth alkylthiolate represented by Formula (1c) below:

or a compound represented by Formula (1d) below:

Each R in Formulas (1c) and (1d) is an alkyl group having 1 to 10 carbon atoms and may be the same or different.

As component (A), a compound not having a bond between a rare earth element and carbon is preferable. Therefore, the above-described compound (1c) or compound (1d) may be suitably used.

—Compound Having a Cyclopentadiene Skeleton (Component (B))—

Component (B) may be any component that has a cyclopentadiene skeleton, such as cyclopentadiene and all cyclopentadiene derivatives.

In this embodiment, in particular in order to allow an advantageous increase in the bulkiness as a polymerization catalyst, shortening of the reaction time, and an increase in the reaction temperature, at least one selected from the group consisting of substituted or unsubstituted cyclopentadiene, substituted or unsubstituted indene (a compound having an indenyl group), and substituted or unsubstituted fluorene may be used.

One type of the compounds having a cyclopentadiene skeleton may be used alone, or a combination of two or more types may be used.

Examples of the substituted cyclopentadiene include pentamethylcyclopentadiene, tetramethylcyclopentadiene, isopropylcyclopentadiene, trimethylsilyl-tetramethylcyclopentadiene, and the like.

Examples of the substituted indene include indene, 2-phenyl-1H-indene, 3-benzyl-1H-indene, 3-methyl-2-phenyl-1H-indene, 3-benzyl-2-phenyl-1H-indene, 1-benzyl-1H-indene, and the like. In particular, in order to reduce the molecular weight distribution, 3-benzyl-1H-indene and 1-benzyl-1H-indene are preferable.

Examples of the substituted fluorene include trimethylsilylfluorene, isopropylfluorene, and the like.

According to this structure, the number of conjugated electrons included in a compound that has a cyclopentadiene skeleton can be increased, and the catalytic activity in the reaction system can be further increased. Therefore, the reaction time can be shortened further, and the reaction temperature can be increased further.

—Organometallic Compound (Component (C))—

Component (C) is a compound represented by Formula (2):

$$YR^4{}_aR^5{}_bR^6{}_c$$

where Y is a metal element selected from the group consisting of Group 1, Group 2, Group 12, and Group 13 of the periodic table; $R^4$ and $R^5$ are each a hydrogen atom or a hydrocarbon group having 1 to 10 carbon atoms; R6 is a hydrocarbon group having 1 to 10 carbon atoms; $R^4$, $R^5$, and $R^6$ are identical to or different from each other; a is 1 and b and c are both 0 when Y is a metal element of Group 1; a and b are 1 and c is 0 when Y is a metal element of Group 2 or Group 12; and a, b, and c are all 1 when Y is a metal element of Group 13.

In order to increase the catalytic activity, at least one of $R^4$, $R^5$, and $R^6$ in Formula (2) is preferably different.

In greater detail, Component (C) is preferably an organoaluminum compound represented by Formula (3):

$$AlR^7R^8R^9 \qquad (3)$$

where $R^7$ and $R^8$ are each a hydrogen atom or a hydrocarbon group having 1 to 10 carbon atoms, $R^9$ is a hydrocarbon group having 1 to 10 carbon atoms, and $R^7$, $R^8$, and $R^9$ may be identical to or different from each other.

Examples of the organoaluminum compound include: trimethyl aluminum, triethyl aluminum, tri-n-propyl aluminum, triisopropyl aluminum, tri-n-butyl aluminum, triisobutyl aluminum, tri-t-butyl aluminum, tripentyl aluminum, trihexyl aluminum, tricyclohexyl aluminum, trioctyl aluminum; diethyl aluminum hydride, di-n-propyl aluminum hydride, di-n-butyl aluminum hydride, diisobutyl aluminum hydride, dihexyl aluminum hydride, diisohexyl aluminum hydride, dioctyl aluminum hydride, diisooctyl aluminum hydride; ethyl aluminum dihydride, n-propyl aluminum dihydride, and isobutyl aluminum dihydride, with the triethyl aluminum, triisobutyl aluminum, diethyl aluminum hydride, and diisobutyl aluminum hydride being preferred, and the diisobutyl aluminum hydride being particularly preferred.

One type of the organoaluminum compounds may be used alone, or a combination of two or more types may be used.

—Aluminoxane Compound (Component (D))—

Component (D) is a compound obtained by placing an organoaluminum compound and a condensation agent in contact.

By using component (D), the catalytic activity in the polymerization reaction system can be further improved. Therefore, the reaction time can be shortened further, and the reaction temperature can be increased further.

Examples of the organoaluminum compound include trialkyl aluminum such as trimethyl aluminum, triethyl aluminum, triisobutyl aluminum, and the like, and mixtures thereof. In particular, a mixture of trimethyl aluminum, trimethyl aluminum, and tributyl aluminum is preferred.

Examples of the condensation agent include water.

Examples of component (D) include aluminoxane represented by Formula (4):

$$-(Al(R^{10})O)_n- \qquad (4)$$

where $R^{10}$ is a hydrocarbon group having 1 to 10 carbon atoms, and a portion of the hydrocarbon group may be substituted by a halogen and/or alkoxy group; $R^{10}$ may be identical or different between repeating units; and n is 5 or more.

The molecular structure of the aluminoxane may be linear or cyclic.

The value of n is preferably 10 or greater.

Examples of the hydrocarbon group of $R^{10}$ include a methyl group, ethyl group, propyl group, and isobutyl group. In particular, a methyl group is preferred. One type of the hydrocarbon groups may be used alone, or a combination of two or more types may be used. As the hydrocarbon group of R, a combination of a methyl group and an isobutyl group is preferred.

The aforementioned aluminoxane preferably has highly solubility in aliphatic hydrocarbons and preferably has low solubility in aromatic hydrocarbons. For example, commercially available aluminoxane is preferable as a hexane solution.

Examples of aliphatic hydrocarbons include hexane and cyclohexane.

Component (D) may, in particular, be modified aluminoxane (TMAO) represented by Formula (5):

$$-(Al(CH_3)_x(i\text{-}C_4H_9)_yO)_m- \qquad (5)$$

where in Formula (5), x+y is 1, and m is 5 or more.

Examples of TMAO include TMAO341, produced by Tosoh Finechem Corporation.

Component (D) may be modified aluminoxane (MMAO) represented by Formula (6):

$$-(Al(CH_3)_{0.7}(i\text{-}C_4H_9)_{0.3}O)_k- \qquad (6)$$

where k is 5 or more.

Examples of MMAO include MMAO-3A, produced by Tosoh Finechem Corporation.

Furthermore, component (D) may, in particular, be modified aluminoxane (PMAO) represented by Formula (7):

$$-[(CH_3)AlO]_i- \qquad (7)$$

where i is 5 or more.

Examples of PMAO include TMAO-211, produced by Tosoh Finechem Corporation.

In order to strengthen the effect of increasing the catalytic activity, among the aforementioned MMAO, TMAO, and PMAO, component (D) is preferably MMAO or TMAO. In particular, in order to further strengthen the effect of increasing the catalytic activity, component (D) is preferably TMAO.

—Halogen Compound (Component (E))—

Component (E) is at least one compound selected from the group consisting of a halogen containing compound that is a Lewis acid (compound (E-1)), a complex compound of a metal halide and a Lewis base (compound (E-2)), and an organic compound including an active halogen (compound (E-3)).

These compounds react with compound (A), i.e. with a rare earth element containing compound that has an M-N bond or the reactants of this rare earth element containing compound and a Lewis base, thereby generating a cationic transition metal compound, a halogenated transition metal compound, and/or a transition metal compound in a state of charge deficiency at the transition metal center.

By using component (E), the cis-1,4-bond content of the conjugated diene polymer can be improved.

Examples of component (E-1) include halogen containing compounds that include an element of Group 3, Group 4, Group 5, Group 6, Group 8, Group 13, Group 14, or Group 15. In particular, a halide of aluminum or a halide of an organic metal is preferred.

Examples of halogen containing compounds that are a Lewis acid include titanium tetrachloride, tungsten hexachloride, tri(pentafluorophenyl)borate, methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride, aluminum tribromide, tri(pentafluorophenyl)aluminum, dibutyltin dichloride, tin tetrachloride, phosphorus trichloride, phosphorus pentachloride, antimony trichloride, and antimony pentachloride. In particular, ethyl aluminum dichloride, ethyl aluminum dibromide, diethyl aluminum chloride, diethyl aluminum bromide, ethyl aluminum sesquichloride, and ethyl aluminum sesquibromide are preferred.

Chloride or bromine is preferred as a halogen.

One of the halogen containing compounds that is a Lewis acid may be used alone, or a combination of two or more types may be used.

Examples of the metal halide used in component (E-2) include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, and gold bromide. Of these, magnesium chloride, calcium chloride, barium chloride, zinc chloride, manganese chloride, and copper chloride are preferable, and magnesium chloride, zinc chloride, manganese chloride, and copper chloride are particularly preferable.

The Lewis base used in component (E-2) is preferably a phosphorus compound, a carbonyl compound, a nitrogen compound, an ether compound, alcohol, or the like.

Examples include tributyl phosphate, tri-2-ethylhexyl phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, lauryl alcohol, and the like. In particular, tri-2-ethylhexyl phosphate, tricresyl phosphate, acetylacetone, 2-ethylhexanoic acid, versatic acid, 2-ethylhexyl alcohol, 1-decanol, and lauryl alcohol are preferred.

The number of moles of the Lewis base that is reacted is in a proportion of 0.01 moles to 30 moles, preferably 0.5 moles to 10 moles, per mole of the metal halide. The use of the reactant with the Lewis base reduces the metal remaining in the polymer.

Examples of component (E-3) include benzyl chloride.

The following describes the weight ratio between components in the example polymerization catalyst composition.

In order to obtain sufficient catalytic activity, the ratio in moles of component (B) (compound having a cyclopentadiene skeleton) to component (A) (rare earth element compound) is preferably greater than zero, more preferably 0.5 or greater, and particularly preferably 1 or greater. In order to suppress a reduction in catalytic activity, this ratio is preferably 3 or less, more preferably 2.5 or less, and particularly preferably 2.2 or less.

In order to improve the catalytic activity in the reaction system, the ratio in moles of component (C) (organometallic compound) to component (A) is preferably 1 or greater and more preferably 5 or greater. In order to suppress a reduction in catalytic activity in the reaction system, this ratio is preferably 50 or less, more preferably 30 or less, and specifically is preferably about 10.

In order to improve the catalytic activity in the reaction system, the ratio in moles of the aluminum in component (D) (aluminoxane) to the rare earth element in component (A) is preferably 10 or greater and more preferably 100 or greater. In order to suppress a reduction in catalytic activity in the reaction system, this ratio is preferably 1000 or less and is more preferably 800 or less.

In order to improve the catalytic activity, the ratio in moles of component (E) (halogen compound) to component (A) is preferably zero or greater, more preferably 0.5 or greater, and particularly preferably 1.0 or greater. In order to maintain the solubility of component (E) and suppress a reduction in catalytic activity, this ratio is preferably 20 or less and is more preferably 10 or less.

Therefore, with the above ranges, the effect of improving the cis-1,4-bond content of conjugated diene polymer can be improved.

The example polymerization catalyst composition preferably does not include an ionic compound composed of a non-coordinating anion (such as a tetravalent boron anion or the like) and a cation (for example, a carbonium cation, an oxonium cation, an ammonium cation, a phosphonium cation, a cycloheptatrienyl cation, or a ferrocenium cation that has a transition metal). The ionic compound has high solubility in aromatic hydrocarbons and has low solubility in hydrocarbons. Therefore, by adopting a polymerization catalyst composition that does not include an ionic compound, a conjugated diene polymer can be manufactured while further reducing the burden on the environment and manufacturing costs.

Stating "does not include an ionic compound" refers to the ratio of the ionic compound included in the polymerization catalyst composition being less than 0.01 wt %.

—Conjugated Diene Monomer—

Examples of the conjugated diene monomer used in the example method for manufacturing a conjugated diene polymer of this disclosure include 1,3-butadiene, isoprene, 1,3-pentadiene, 2,3-dimethyl-1,3-butadiene, and 1,3-hexadiene. In particular, in order to improve various characteristics of the rubber composition, tire, and the like, 1,3-butadiene and isoprene are preferred.

One type these may be used alone, or a combination of two or more types may be used.

In particular, when the conjugated diene monomer is isoprene and 1,3-butadiene, then in order to improve the catalytic activity in the reaction system and to reduce the molecular weight distribution, the ratio of isoprene to 1,3-butadiene is preferably 1 or greater, more preferably 3 or greater, and particularly preferably 7 or greater.

The reagents used in each process may be used without a solvent or with solvents appropriate for the various reagents.

In each process, the reagents and solvents are preferably used after appropriate purification, such as distillation, deaeration, freeze drying, and the like.

The aforementioned processes, in particular in the catalyst system preparation process and the polymerization reaction process, are preferably performed under an inert gas atmosphere, such as nitrogen gas or argon gas.

In order to obtain sufficient catalytic activity, the mole amount of component (A) relative to 100 g of the conjugated diene monomer is preferably 0.01 mmol or greater and more preferably 0.03 mmol or greater, and in order to prevent excessive catalysis, is preferably 0.5 mmol or less and more preferably 0.05 mmol or less.

Any solvent that is inactive in the polymerization reaction may be used. Examples include n-hexane, cyclohexane, and a mixture thereof. An aromatic hydrocarbon with strong toxicity (benzene, toluene, xylene, or the like) is not necessary.

In the polymerization reaction process, any well-known method in this technical field may be used, such as solution polymerization, suspension polymerization, liquid phase bulk polymerization, emulsion polymerization, gas phase polymerization, or solid phase polymerization.

The reaction temperature may be any temperature, such as −100° C. to 300° C., is preferably 0° C. to 200° C., and is more preferably 25° C. to 120° C. At high temperatures, the cis-1,4-selectability may degrade, and at low temperatures, the reaction speed may decrease.

The reaction pressure may be any pressure, such as ordinary pressure. At high pressures, the conjugated diene monomer might not be sufficiently incorporated into the polymerization reaction system, whereas at low pressures, the reaction speed may decrease.

The reaction time may be any time, such as 30 minutes to 3 hours.

The method for manufacturing a conjugated diene polymer of this disclosure is not limited to the aforementioned example method for manufacturing. For example, in the aforementioned example method for manufacturing, the compound having a cyclopentadiene skeleton may be added in the polymerization reaction process, instead of being included in the polymerization catalyst composition in the catalyst system preparation process.

(Conjugated Diene Polymer)

An example of a conjugated diene polymer of this disclosure (example conjugated diene polymer) is manufactured with the example method for manufacturing a conjugated diene polymer of this disclosure.

The example conjugated diene polymer has an extremely high cis-1,4-bond content of 95% or higher. Hence, a conjugated diene polymer with abundant elasticity can be provided and can be used as the rubber component in a rubber composition.

The example conjugated diene polymer may be a homopolymer of a conjugated diene monomer or may be a copolymer.

The cis-1,4-bond content of the example conjugated diene polymer is 95% or greater, preferably 97% or greater, and even more preferably 98% or greater. As the value is higher, the elongation-induced crystallization ability of the conjugated diene polymer can be increased, and the elasticity of the conjugated diene polymer can be increased.

The trans-1,4-bond content may be any value but is preferably less than 5%, more preferably less than 3%, and particularly preferably less than 1%. As the value is lower, the elongation-induced crystallization ability of the conjugated diene polymer can be increased, and the elasticity of the conjugated diene polymer can be increased.

The 1,2-vinyl bond content may be any value but is preferably 5% or less, more preferably 3% or less, and particularly preferably 1% or less. As the value is lower, the elongation-induced crystallization ability of the isoprene-butadiene block copolymer can be increased, and the elasticity of the isoprene-butadiene block copolymer can be increased.

The 3,4-vinyl bond content may be any value but is preferably 5% or less, more preferably 3% or less, and particularly preferably 1% or less. As the value is lower, the elongation-induced crystallization ability of the conjugated diene polymer can be increased, and the elasticity of the conjugated diene polymer can be increased.

The number-average molecular weight (Mn) of the example conjugated diene polymer is preferably 400,000 or greater and more preferably 500,000 or greater.

The molecular weight distribution (Mw/Mn) is preferably 3 or less and more preferably 2 or less.

Examples of the conjugated diene polymer include polybutadiene, polyisoprene, polypentadiene, polydimethylbutadiene, and polyhexadiene. In particular, in order to improve various characteristics of the rubber composition, tire, and the like, polybutadiene and polyisoprene are preferred.

The method for manufacturing a conjugated diene polymer of this embodiment may be a method for manufacturing an isoprene-butadiene block copolymer that copolymerizes isoprene and 1,3-butadiene.

The following describes an example of a method for manufacturing an isoprene-butadiene block copolymer of this disclosure.

The example of a method for manufacturing an isoprene-butadiene block copolymer of this disclosure (example method for manufacturing a block copolymer) is a method for using the above-described example polymerization catalyst composition of this disclosure to copolymerize isoprene and 1,3-butadiene.

Specifically, the example method for manufacturing a block copolymer includes:

a monomer preparation process to prepare isoprene and 1,3-butadiene;

a catalyst system preparation process to prepare the above-described example polymerization catalyst composition of this disclosure; and a copolymerization reaction process that includes a first polymerization reaction process to mix a polymerization catalyst composition and a first monomer, which is one of isoprene and 1,3-butadiene, and polymerize the first monomer, and a second polymerization reaction process, after the first polymerization reaction process, to add a second monomer, which is the other of isoprene and 1,3-butadiene, and polymerize the second monomer.

In this example method for manufacturing a block copolymer, first, the above-described example polymerization catalyst composition of this disclosure is prepared. Then, by mixing isoprene and 1,3-butadiene with the polymerization catalyst composition, copolymerization of isoprene and 1,3-butadiene is achieved while preparing the reaction system that includes a rare earth element compound and a compound having a cyclopentadiene skeleton.

—Monomer Preparation Process—

The isoprene and 1,3-butadiene prepared in the monomer preparation process are not particularly restricted, and commercially available isoprene and 1,3-butadiene may be used.

—Catalyst System Preparation Process—

The polymerization catalyst composition prepared in the catalyst system preparation process is described below.

—Polymerization Catalyst Composition—

An example of the polymerization catalyst composition used in this disclosure (example polymerization catalyst composition) is as described above.

—Copolymerization Reaction Process—

In the copolymerization reaction process, any well-known method in this technical field may be used, such as solution polymerization, suspension polymerization, liquid phase bulk polymerization, emulsion polymerization, gas phase polymerization, or solid phase polymerization.

The reaction temperature may be any temperature, such as −80° C. to 100° C., is preferably 10° C. to 80° C., and is more preferably 25° C. to 50° C. At high temperatures, the cis-1,4-selectability may degrade, and at low temperatures, the reaction speed may decrease.

The reaction time may be any time, such as 30 minutes to 3 hours.

In order to improve the catalytic activity in the reaction system and to reduce the molecular weight distribution, the ratio of isoprene to 1,3-butadiene is preferably 1 or greater, more preferably 3 or greater, and particularly preferably 7 or greater.

In order to obtain sufficient catalytic activity, the mole amount of component (A) relative to 100 g of the first monomer, which is one of isoprene and 1,3-butadiene, is preferably 0.01 mmol or greater and more preferably 0.03 mmol or greater, and in order to prevent excessive catalysis, is preferably 0.5 mmol or less and more preferably 0.05 mmol or less.

The reagents used in each process may be used without a solvent or with solvents appropriate for the various reagents.

In each process, the reagents and solvents are preferably used after appropriate purification, such as distillation, deaeration, freeze drying, and the like.

The aforementioned processes, in particular in the catalyst system preparation process and the polymerization reaction process, are preferably performed under an inert gas atmosphere, such as nitrogen gas or argon gas.

As the solvent used in the example method for manufacturing a block copolymer, any solvent that is inactive in the polymerization reaction may be used. Examples include n-hexane, cyclohexane, and a mixture thereof. An aromatic hydrocarbon with strong toxicity (benzene, toluene, xylene, or the like) is not necessary.

The method for manufacturing an isoprene-butadiene block copolymer of this disclosure is not limited to the aforementioned example method for manufacturing. For example, in the aforementioned example method for manufacturing, the compound having a cyclopentadiene skeleton may be added in the copolymerization reaction process, instead of being included in the polymerization catalyst composition in the catalyst system preparation process.

(Isoprene-Butadiene Block Copolymer)

An example of an isoprene-butadiene block copolymer of this disclosure (example block copolymer) is manufactured by the example method for manufacturing an isoprene-butadiene block copolymer of this disclosure.

The example block copolymer has an extremely high cis-1,4-bond content of 98% or higher. Hence, an isoprene-butadiene block copolymer with abundant elasticity can be provided and can be used as the rubber component in a rubber composition.

The structure of the block copolymer is one of $(A-B)_x$, $A-(B-A)_x$, and $B-(A-B)_x$ (where A is a block sequence constituted by a monomer unit of isoprene, B is a block sequence constituted by a monomer unit of 1,3-butadiene, and x is an integer of 1 or greater). A block copolymer containing multiple (A-B) or (B-A) structures is referred to as a multiblock copolymer.

The content of the portion derived from isoprene in the example block copolymer is preferably 20% or greater and more preferably 50% or greater. On the other, the content of the portion derived from butadiene in the isoprene-butadiene block copolymer is preferably 80% or less and more preferably 50% or less. These contents indicate the ratio in moles with respect to the entire block copolymer.

The cis-1,4-bond content of the portion derived from isoprene in the example block copolymer is 98.0% or greater, preferably 98.5% or greater, and even more preferably 99.0% or greater. As the value is higher, the elongation-induced crystallization ability of the isoprene-butadiene block copolymer can be increased, and the elasticity of the isoprene-butadiene block copolymer can be increased.

The trans-1,4-bond content of the portion derived from isoprene may be any value but is preferably less than 2.0%, more preferably less than 1.5%, and particularly preferably less than 1.0%. As the value is lower, the elongation-induced crystallization ability of the isoprene-butadiene block copolymer can be increased, and the elasticity of the isoprene-butadiene block copolymer can be increased.

The 1,2-vinyl bond content of the portion derived from isoprene may be any value but is preferably 2.0% or less, more preferably 1.5% or less, and particularly preferably 1.0% or less. As the value is lower, the elongation-induced crystallization ability of the isoprene-butadiene block copolymer can be increased, and the elasticity of the isoprene-butadiene block copolymer can be increased.

The 3,4-vinyl bond content of the portion derived from isoprene may be any value but is preferably 2.0% or less, more preferably 1.5% or less, and particularly preferably 1.0% or less. As the value is lower, the elongation-induced crystallization ability of the isoprene-butadiene block copolymer can be increased, and the elasticity of the isoprene-butadiene block copolymer can be increased.

The cis-1,4-bond content, trans-1,4-bond content, 1,2-vinyl bond content, and 3,4-vinyl bond content do not refer to the ratio with respect to the entire block copolymer, but rather the amount in the portion derived from isoprene.

The cis-1,4-bond content of the portion derived from butadiene in the example block copolymer is 98% or greater, preferably 98.5% or greater, and even more preferably 99% or greater. As the value is higher, the elongation-induced crystallization ability of the isoprene-butadiene block copolymer can be increased, and the elasticity of the isoprene-butadiene block copolymer can be increased.

The trans-1,4-bond content of the portion derived from butadiene may be any value but is preferably less than 5%, more preferably less than 3%, and particularly preferably less than 1%. As the value is lower, the elongation-induced crystallization ability of the isoprene-butadiene block copolymer can be increased, and the elasticity of the isoprene-butadiene block copolymer can be increased.

The vinyl bond content of the portion derived from butadiene may be any value but is preferably 5% or less, more preferably 3% or less, and particularly preferably 1% or less. As the value is lower, the elongation-induced crystallization ability of the isoprene-butadiene block copolymer can be increased, and the elasticity of the isoprene-butadiene block copolymer can be increased.

The cis-1,4-bond content, trans-1,4-bond content, and vinyl bond content do not refer to the ratio with respect to the entire block copolymer, but rather the amount in the portion derived from butadiene.

When simply referring to the "cis-1,4-bond content" in the example block copolymer without specifying either the isoprene portion or the butadiene portion, the cis-1,4-bond content in the entire isoprene-butadiene block copolymer is being indicated.

The number-average molecular weight (Mn) of the example block copolymer is preferably 50,000 to 6,000,000 and is more preferably 1,000,000 to 3,000,000.

The molecular weight distribution (Mw/Mn) is preferably 4 or less and more preferably 3 or less.

The method for manufacturing a conjugated diene polymer of this embodiment may be a method for manufacturing an isoprene-butadiene random copolymer that copolymerizes isoprene and 1,3-butadiene.

The following describes an example of a method for manufacturing an isoprene-butadiene random copolymer of this disclosure.

The example of a method for manufacturing an isoprene-butadiene random copolymer of this disclosure (example method for manufacturing a random copolymer) requires the use of the above-described example polymerization catalyst composition of this disclosure to copolymerize isoprene and 1,3-butadiene.

Specifically, the example method for manufacturing a random copolymer includes:

a monomer preparation process to prepare isoprene and 1,3-butadiene;

a catalyst system preparation process to prepare the above-described example polymerization catalyst composition of this disclosure; and a copolymerization reaction process to mix the polymerization catalyst composition with isoprene and 1,3-butadiene and polymerize the isoprene and 1,3-butadiene (random polymerization).

In this example method for manufacturing a random copolymer, first, the above-described example polymerization catalyst composition of this disclosure is prepared. Then, by mixing isoprene and 1,3-butadiene with the polymerization catalyst composition, copolymerization of isoprene and 1,3-butadiene is achieved while preparing the reaction system that includes a rare earth element compound and a compound having a cyclopentadiene skeleton.

—Monomer Preparation Process—

The isoprene and 1,3-butadiene prepared in the monomer preparation process are not particularly restricted, and commercially available isoprene and 1,3-butadiene may be used.

—Catalyst System Preparation Process—

The polymerization catalyst composition prepared in the catalyst system preparation process is described below.

—Polymerization Catalyst Composition—

An example of the polymerization catalyst composition used in this disclosure (example polymerization catalyst composition) is as described above.

—Copolymerization Reaction Process—

In the copolymerization reaction process, any well-known method in this technical field may be used, such as solution polymerization, suspension polymerization, liquid phase bulk polymerization, emulsion polymerization, gas phase polymerization, or solid phase polymerization.

The reaction temperature may be any temperature, such as $-80°$ C. to $100°$ C., is preferably $10°$ C. to $80°$ C., and is more preferably $25°$ C. to $50°$ C. At high temperatures, the cis-1,4-selectability may degrade, and at low temperatures, the reaction speed may decrease.

The reaction time may be any time, such as 30 minutes to 3 hours.

In order to improve the catalytic activity in the reaction system and to reduce the molecular weight distribution, the ratio of isoprene to 1,3-butadiene is preferably 1 or greater, more preferably 3 or greater, and particularly preferably 7 or greater.

In order to obtain sufficient catalytic activity, the mole amount of component (A) relative to 100 g of the total monomer amount (total amount of isoprene and 1,3-butadiene) is preferably 0.01 mmol or greater and more preferably 0.03 mmol or greater, and in order to prevent excessive catalysis, is preferably 0.5 mmol or less and more preferably 0.05 mmol or less.

The reagents used in each process may be used without a solvent or with solvents appropriate for the various reagents.

In each process, the reagents and solvents are preferably used after appropriate purification, such as distillation, deaeration, freeze drying, and the like.

The aforementioned processes, in particular in the catalyst system preparation process and the polymerization reaction process, are preferably performed under an inert gas atmosphere, such as nitrogen gas or argon gas.

As the solvent used in the example method for manufacturing a random copolymer, any solvent that is inactive in the polymerization reaction may be used. Examples include n-hexane, cyclohexane, and a mixture thereof. An aromatic hydrocarbon with strong toxicity (benzene, toluene, xylene, or the like) is not necessary.

The method for manufacturing an isoprene-butadiene random copolymer of this disclosure is not limited to the aforementioned example method for manufacturing. For example, in the aforementioned example method for manufacturing, the compound having a cyclopentadiene skeleton may be added in the copolymerization reaction process, instead of being included in the polymerization catalyst composition in the catalyst system preparation process.

(Isoprene-Butadiene Random Copolymer)

An example of an isoprene-butadiene random copolymer of this disclosure (example random copolymer) is manufactured by the example method for manufacturing an isoprene-butadiene random copolymer of this disclosure.

The example random copolymer has an extremely high cis-1,4-bond content of 98% or higher. Hence, an isoprene-butadiene random copolymer with abundant elasticity can be provided and can be used as the rubber component in a rubber composition.

In the random copolymer, the sequence of isoprene and 1,3-butadiene monomer units is irregular.

The content of the portion derived from isoprene in the example random copolymer is preferably 20% or greater and more preferably 50% or greater. On the other, the content of the portion derived from butadiene in the isoprene-butadiene random copolymer is preferably 80% or less and more preferably 50% or less. These contents indicate the ratio in moles with respect to the entire random copolymer.

The cis-1,4-bond content of the portion derived from isoprene in the example random copolymer is 98.0% or greater, preferably 98.5% or greater, and even more preferably 99.0% or greater. As the value is higher, the elongation-induced crystallization ability of the isoprene-butadiene random copolymer can be increased, and the elasticity of the isoprene-butadiene random copolymer can be increased.

The trans-1,4-bond content of the portion derived from isoprene may be any value but is preferably less than 2.0%, more preferably less than 1.5%, and particularly preferably less than 1.0%. As the value is lower, the elongation-induced crystallization ability of the isoprene-butadiene random copolymer can be increased, and the elasticity of the isoprene-butadiene random copolymer can be increased.

The 1,2-vinyl bond content of the portion derived from isoprene may be any value but is preferably 2.0% or less, more preferably 1.5% or less, and particularly preferably 1.0% or less. As the value is lower, the elongation-induced crystallization ability of the isoprene-butadiene random copolymer can be increased, and the elasticity of the isoprene-butadiene random copolymer can be increased.

The 3,4-vinyl bond content of the portion derived from isoprene may be any value but is preferably 2.0% or less, more preferably 1.5% or less, and particularly preferably 1.0% or less. As the value is lower, the elongation-induced crystallization ability of the isoprene-butadiene random copolymer can be increased, and the elasticity of the isoprene-butadiene random copolymer can be increased.

The cis-1,4-bond content, trans-1,4-bond content, 1,2-vinyl bond content, and 3,4-vinyl bond content do not refer to the ratio with respect to the entire random copolymer, but rather the amount in the portion derived from isoprene.

The cis-1,4-bond content of the portion derived from butadiene in the example random copolymer is 98% or greater, preferably 98.5% or greater, and even more preferably 99% or greater. As the value is higher, the elongation-induced crystallization ability of the isoprene-butadiene random copolymer can be increased, and the elasticity of the isoprene-butadiene random copolymer can be increased.

The trans-1,4-bond content of the portion derived from butadiene may be any value but is preferably less than 5%, more preferably less than 3%, and particularly preferably less than 1%. As the value is lower, the elongation-induced crystallization ability of the isoprene-butadiene random copolymer can be increased, and the elasticity of the isoprene-butadiene random copolymer can be increased.

The vinyl bond content of the portion derived from butadiene may be any value but is preferably 5% or less, more preferably 3% or less, and particularly preferably 1% or less. As the value is lower, the elongation-induced crystallization ability of the isoprene-butadiene random copolymer can be increased, and the elasticity of the isoprene-butadiene random copolymer can be increased.

The cis-1,4-bond content, trans-1,4-bond content, and vinyl bond content do not refer to the ratio with respect to the entire random copolymer, but rather the amount in the portion derived from butadiene.

When simply referring to the "cis-1,4-bond content" in the example random copolymer without specifying either the isoprene portion or the butadiene portion, the cis-1,4-bond content in the entire isoprene-butadiene random copolymer is being indicated.

The number-average molecular weight (Mn) of the example random copolymer is preferably 50,000 to 6,000,000 and is more preferably 1,000,000 to 3,000,000.

The molecular weight distribution (Mw/Mn) is preferably 4 or less and more preferably 3 or less.

(Rubber Composition)

An example of a rubber composition of this disclosure (example rubber composition) needs to include the example conjugated diene polymer of this disclosure. The example conjugated diene polymer of this disclosure may be a rubber component.

The example rubber composition may include a rubber component other than the example conjugated diene polymer and may also include a filler, age resistor, softener, stearic acid, zinc oxide, vulcanization accelerator, vulcanizing agent, oil, sulfur, or the like.

The example rubber composition may be manufactured with a method known to those of ordinary skill in the art.

(Tire)

An example of a tire of this disclosure (example tire) needs to be manufactured using the example rubber composition of this disclosure. All of the members of the example tire may be manufactured using the example rubber composition.

The example tire may be manufactured with a method known to those of ordinary skill in the art.

Rubber products other than a tire, such as shoes, belts, flooring, and the like may also be manufactured using the example rubber composition.

EXAMPLES

The present disclosure is described in more detail below with reference to Examples, by which the present disclosure is not intended to be limited in any way.

(Manufacturing of Conjugated Diene Polymers)

Conjugated diene polymers were manufactured according to the following experimental points.

Example A1

First, 800 g of hexane solution including 120 g (1.76 mol) of isoprene (conjugated diene monomer) were added into a thoroughly dried stainless-steel 2 L reactor.

On the other hand, 70.0 µmol of trisbistrimethylsilylamide gadolinium ($Gd[N(SiMe_3)_2]_3$) (component (A)), 140.0 µmol of 2-phenylindene (component (B)), and 0.70 mmol of diisobutyl aluminum hydride (component (C)) were added to a glass container in a glovebox under a nitrogen atmosphere and were dissolved in 30 mL of hexane. MMAO (MMAO-3A, produced by Tosoh Finechem Corporation) (component (D)) was then added to the glass container, with the ratio in moles of the aluminum in the MMAO to the gadolinium in the trisbistrimethylsilylamide gadolinium being 200. Then, 140.0 µmol of diethyl aluminum chloride (component (E-1)) were further added to yield the polymerization catalyst composition.

Subsequently, the polymerization catalyst composition was removed from the glovebox, and an amount of polymerization catalyst composition that included 60.0 µmol of gadolinium was added to a 2 L reactor including isoprene. This reaction system was maintained at 50° C. for 60 minutes, and a polymerization reaction of isoprene was carried out. Subsequently, 5 mL of an isopropanol solution (5% by mass) of 2,2'-methylene-bis (6-t-butyl-4-ethylphenol) (Nocrac NS-5, manufactured by Ouchi Shinko Chemical Industrial Co., Ltd.) were added to the reaction system to stop the polymerization reaction. Furthermore, the reaction product was precipitated and separated by adding a large amount of methanol to the reactor. The result was then vacuum-dried at 60° C. to obtain polymer AA (yield: 116 g).

Throughout this manufacturing, no aromatic hydrocarbon (toluene or the like) was used.

Example A2

A polymerization catalyst composition was prepared and a polymerization reaction was carried out in the same way as in Example A1, except for using 3-benzylindene instead of 2-phenylindene, to obtain polymer AB (yield: 116 g).

Example A3

A polymerization catalyst composition was prepared and a polymerization reaction was carried out in the same way as in Example A1, except for using indene instead of 2-phenylindene, to obtain polymer AC (yield: 105 g).

Comparative Example A1

A polymerization catalyst composition was prepared and a polymerization reaction was carried out in the same way as in Example A1, except for not using 2-phenylindene and for maintaining the reaction system at 50° C. for 180 minutes, to obtain polymer AD (yield: 60 g).

Comparative Example A2

A polymerization catalyst composition was prepared and a polymerization reaction was carried out in the same way as in Example A1, except for using bis(2-phenylindenyl) gadolinium bis(dimethylsilylamide) ((2-PhC$_9$H$_6$)$_2$GdN(SiHMe$_2$)$_2$) (metallocene catalyst) instead of trisbistrimethylsilylamide gadolinium and 2-phenylindene and for maintaining the reaction system at 50° C. for 180 minutes, to obtain polymer AE (yield: 75 g).

Example A4

First, 800 g of hexane solution including 150 g (2.78 mol) of 1,3-butadiene (conjugated diene monomer) were added into a thoroughly dried stainless-steel 2 L reactor.

On the other hand, 15.0 μmol of trisbistrimethylsilylamide gadolinium (Gd[N(SiMe$_3$)$_2$]$_3$) (component (A)), 45.0 μmol of 3-benzylindene (component (B)), and 0.018 mmol of diisobutyl aluminum hydride (component (C)) were added to a glass container in a glovebox under a nitrogen atmosphere and were dissolved in 10 mL of hexane. MMAO (MMAO-3A, produced by Tosoh Finechem Corporation) (component (D)) was then added to the glass container, with the ratio in moles of the aluminum in the MMAO to the gadolinium in the trisbistrimethylsilylamide gadolinium being 500. Then, 30.0 μmol of diethyl aluminum chloride (component (E-1)) were further added to yield the polymerization catalyst composition.

Subsequently, the polymerization catalyst composition was removed from the glovebox, and an amount of polymerization catalyst composition that included 15.0 μmol of gadolinium was added to a 2 L reactor including 1,3-butadiene. This reaction system was maintained at 60° C. for 60 minutes, and a polymerization reaction of 1,3-butadiene was carried out. Subsequently, 5 mL of an isopropanol solution (5% by mass) of 2,2'-methylene-bis (6-t-butyl-4-ethylphenol) (Nocrac NS-5, manufactured by Ouchi Shinko Chemical Industrial Co., Ltd.) were added to the reaction system to stop the polymerization reaction. Furthermore, the reaction product was precipitated and separated by adding a large amount of methanol to the reactor. The result was then vacuum-dried at 60° C. to obtain polymer AF (yield: 116 g).

Throughout this manufacturing, no aromatic hydrocarbon (toluene or the like) was used.

Example A5

A polymerization catalyst composition was prepared and a polymerization reaction was carried out in the same way as in Example A4, except for using TMAO (TMAO-341, produced by Tosoh Finechem Corporation) instead of MMAO, to obtain polymer AG (yield: 145 g).

Example A6

A polymerization catalyst composition was prepared and a polymerization reaction was carried out in the same way as in Example A4, except for using 2-phenylindene instead of 3-benzylindene, to obtain polymer AH (yield: 145 g).

Example A7

A polymerization catalyst composition was prepared and a polymerization reaction was carried out in the same way as in Example A4, except for using 3-methyl-2-phenylindene instead of 3-benzylindene, to obtain polymer AI (yield: 105 g).

Example A8

A polymerization catalyst composition was prepared and a polymerization reaction was carried out in the same way as in Example A4, except for using 3-benzyl-2-phenylindene instead of 3-benzylindene, to obtain polymer AJ (yield: 105 g).

Example A9

A polymerization catalyst composition was prepared and a polymerization reaction was carried out in the same way as in Example A4, except for using indene instead of 3-benzylindene, to obtain polymer AK (yield: 105 g).

Comparative Example A3

A polymerization catalyst composition was prepared and a polymerization reaction was carried out in the same way as in Example A4, except for not using 3-benzylindene and for maintaining the reaction system at 60° C. for 180 minutes, to obtain polymer AL (yield: 60 g).

Example A10

A polymerization catalyst composition was prepared and a polymerization reaction was carried out in the same way as in Example A4, except for using PMAO (TMAO-211, produced by Tosoh Finechem Corporation) instead of MMAO and for maintaining the reaction system at 60° C. for 180 minutes, to obtain polymer AM (yield: 30 g).

Example A11

First, 400 mL of hexane solution including 70 g (1.29 mol) of 1,3-butadiene (conjugated diene monomer) were added into a thoroughly dried stainless-steel 2 L reactor.

On the other hand, 50.4 µmol of trisbistrimethylsilylamide gadolinium ($Gd[N(SiMe_3)_2]_3$) (component (A)), 100.0 µmol of 3-benzylindene (component (B)), and 0.75 mmol of diisobutyl aluminum hydride (component (C)) were added to a glass container in a glovebox under a nitrogen atmosphere and were dissolved in 30 mL of hexane. TMAO (TMA0341, produced by Tosoh Finechem Corporation) (component (D)) was then added to the glass container, with the ratio in moles of the aluminum in the TMAO to the gadolinium in the trisbistrimethylsilylamide gadolinium being 67. Then, 25.2 µmol of diethyl aluminum chloride (component (E-1)) were further added to yield the polymerization catalyst composition.

Subsequently, the polymerization catalyst composition was removed from the glovebox, and an amount of polymerization catalyst composition that included 40.0 µmol of gadolinium was added to a 2 L reactor including 1,3-butadiene. This reaction system was maintained at 50° C. for 40 minutes, and a polymerization reaction of 1,3-butadiene was carried out. Subsequently, 1 mL of an isopropanol solution (5% by mass) of 2,2'-methylene-bis (6-t-butyl-4-ethylphenol) (Nocrac NS-5, manufactured by Ouchi Shinko Chemical Industrial Co., Ltd.) was added to the reaction system to stop the polymerization reaction. Furthermore, the reaction product was precipitated and separated by adding a large amount of isopropanol to the reactor. The result was then vacuum-dried at 60° C. to obtain polymer AN (yield: 66 g).

Example A12 to Example A15

A polymerization catalyst composition was prepared and a polymerization reaction was carried out in the same way as in Example A11, except for setting the amount of added diethyl aluminum chloride to 50.4 µmol (Example A12), 100.8 µmol (Example A13), 504 µmol (Example A14), and 1008 µmol (Example A15), to obtain polymers AO to AR (yield: 66 g in Example A12, 67 g in Example A13, 66 g in Example A14, and 65 g in Example A15).

Example A16

A polymerization catalyst composition was prepared and a polymerization reaction was carried out in the same way as in Example A11, except for not adding diethyl aluminum chloride, to obtain polymer AS (yield: 60 g).

Example A17

First, 550 g of hexane solution including 100 g (1.85 mol) of 1,3-butadiene (conjugated diene monomer) were added into a thoroughly dried stainless-steel 2 L reactor.

On the other hand, 15.0 µmol of trisbistrimethylsilylamide gadolinium ($Gd[N(SiMe_3)_2]_3$) (component (A)), 30.0 µmol of 2-phenylindene (component (B)), 0.60 mmol of diisobutyl aluminum hydride (component (C)), and 6.0 mol of triisobutyl aluminum (component (C)) were added to a glass container in a glovebox under a nitrogen atmosphere and were dissolved in 10 mL of hexane. MMAO (MMAO-3A, produced by Tosoh Finechem Corporation) (component (D)) was then added to the glass container, with the ratio in moles of the aluminum in the MMAO to the gadolinium in the trisbistrimethylsilylamide gadolinium being 400, to yield the polymerization catalyst composition.

Subsequently, the polymerization catalyst composition was removed from the glovebox, and an amount of polymerization catalyst composition that included 10.0 µmol of gadolinium was added to a 2 L reactor including 1,3-butadiene. This reaction system was maintained at 50° C. for 80 minutes, and a polymerization reaction of 1,3-butadiene was carried out. Subsequently, 5 mL of an isopropanol solution (5% by mass) of 2,2'-methylene-bis (6-t-butyl-4-ethylphenol) (Nocrac NS-5, manufactured by Ouchi Shinko Chemical Industrial Co., Ltd.) were added to the reaction system to stop the polymerization reaction. Furthermore, the reaction product was precipitated and separated by adding a large amount of methanol to the reactor. The result was then vacuum-dried at 60° C. to obtain polymer AT (yield: 94 g).

Throughout this manufacturing, no aromatic hydrocarbon (toluene or the like) was used.

Example A18

A polymerization catalyst composition was prepared and a polymerization reaction was carried out in the same way as in Example A17, except for halving the amounts of trisbistrimethylsilylamide gadolinium and 2-phenylindene that were used, to obtain polymer AU (yield: 65 g).

Comparative Example A4

A polymerization catalyst composition was prepared and a polymerization reaction was carried out in the same way as in Example A17, except for not using 2-phenylindene and for maintaining the reaction system at 50° C. for 180 minutes, to obtain polymer AV (yield: 60 g).

Comparative Example A5

A polymerization catalyst composition was prepared and a polymerization reaction was carried out in the same way as in Example A17, except for halving the amount of trisbistrimethylsilylamide gadolinium that was used, but no polymer was obtained.

Example A19

A polymerization catalyst composition was prepared and a polymerization reaction was carried out in the same way as in Example A17, except for using bis(2-phenylindenyl) gadolinium bis(dimethylsilylamide) (($2-PhC_9H_6)_2GdN(SiHMe_2)_2$) (metallocene catalyst) instead of trisbistrimethylsilylamide gadolinium and 2-phenylindene and for maintaining the reaction system at 50° C. for 180 minutes, to obtain polymer AX (yield: 78 g).

Example A20

A polymerization catalyst composition was prepared and a polymerization reaction was carried out in the same way as in Example A1, except for using $Gd(OtBu)_3$ instead of trisbistrimethylsilylamide gadolinium, to obtain polymer AY (yield: 116 g).

Example A21

A polymerization catalyst composition was prepared and a polymerization reaction was carried out in the same way as in Example A1, except for using Gd(StBu)₃ instead of trisbistrimethylsilylamide gadolinium, to obtain polymer AZ (yield: 116 g).

Details on the preparation of the polymerization catalyst composition and the manufacturing of the conjugated diene polymer in each Example A and Comparative Example A are listed in Table 1.

The catalytic activity of the polymerization catalyst composition during the manufacturing was calculated by the following formula.

(yield (kg))/((amount of component (A) used (mol))×(reaction time (hours)))

(Analysis of Conjugated Diene Polymers)

Analyses (1) and (2) were performed on the polymers A obtained as above.

(1) Analysis of Microstructure (cis-1,4-Bond Content)

For each of the obtained polymers A, an NMR spectrum was obtained using NMR (AVANCE 600 produced by Bruker). From the integration ratio of the peaks obtained by measuring $^1$H-NMR and $^{13}$C-NMR ('H-NMR: δ 4.6-4.8 (=CH₂ of 3,4-vinyl unit), 5.0-5.2 (—CH= of 1,4-unit), $^{13}$C-NMR: δ 23.4 (1,4-cys unit), 15.9 (1,4-trans unit), 18.6 (3,4-unit)), the cis-1,4-bond content (%) was calculated.

(2) Analysis of Number-Average Molecular Weight (Mn) and Molecular Weight Distribution (Mw/Mn)

By Gel Permeation Chromatography (GPC) (HLC-8220 GPC produced by Tosoh Corporation; two columns: TSKgel GMH$_{XL}$ produced by Tosoh Corporation; detector: differential refractometer (RI)), with monodisperse polystyrene as a reference, the number-average molecular weight (Mn) and the molecular weight distribution (Mw/Mn) of the polymers A in terms of polystyrene were calculated. The measurement temperature was 40° C., and the eluting solvent was THF.

Details on the analysis results of the conjugated diene polymer in each Example A and Comparative Example A are listed in Table 1.

TABLE 1

| | | | | Example A1 | Example A2 | Example A3 | Comparative Example A1 | Comparative Example A2 | Example A4 |
|---|---|---|---|---|---|---|---|---|---|
| specifications of method for manufacturing a conjugated diene polymer | | conjugated diene monomer | | isoprene | isoprene | isoprene | isoprene | isoprene | 1,3-butadiene |
| | polymerization catalyst composition | component (A) | rare earth element compound including at least one nitrogen atom | Gd (*1) | Gd (*1) | Gd (*1) | Gd (*1) | Gd(In) (*2) | Gd (*1) |
| | | component (B) | compound having a cyclopentadiene skeleton | 2-phenyl-indene | 3-benzyl-indene | indene | — | — | 3-benzyl-indene |
| | | component (C) | organometallic compound | diisobutyl aluminum hydride | diisobutyl aluminum hydride | diisobutyl aluminum hydride | diisobutyl aluminum hydride | diisobutyl aluminum hydride | diisobutyl aluminum hydride |
| | | component (D) | aluminoxane compound | MMAO | MMAO | MMAO | MMAO | MMAO | MMAO |
| | | component (E) | halogen compound | diethyl aluminum chloride | diethyl aluminum chloride | diethyl aluminum chloride | diethyl aluminum chloride | diethyl aluminum chloride | diethyl aluminum chloride |
| | | ratio of component (B) to component (A) | | 2 | 2 | 2 | — | — | 3 |
| | | ratio of component (C) to component (A) | | 10 | 10 | 10 | 10 | 10 | 12 |
| | | ratio of aluminum in component (D) to rare earth element in component (A) | | 200 | 200 | 200 | 200 | 200 | 500 |
| | | ratio of component (E) to component (A) | | 2 | 2 | 2 | 2 | 2 | 2 |
| | specifications of polymerization reaction process | solvent | | hexane | hexane | hexane | hexane | hexane | hexane |
| | | reaction system | | homogeneous | homogeneous | homogeneous | homogeneous | homogeneous | homogeneous |
| | | reaction temperature (° C.) | | 50 | 50 | 50 | 50 | 50 | 60 |
| | | reaction pressure (atm) | | ordinary pressure | ordinary pressure | ordinary pressure | ordinary pressure | ordinary pressure | ordinary pressure |
| | | reaction time (min) | | 60 | 60 | 60 | 180 | 180 | 60 |
| | | yield as an amount (g) | | 116 | 116 | 105 | 60 | 75 | 116 |
| | | yield as a percentage (%) | | 96 | 96 | 88 | 50 | 63 | 96 |
| | | activity (kg/mol · time) | | 1930 | 1930 | 1750 | 330 | 420 | 9700 |
| | | conjugated diene polymer | | polymer AA | polymer AB | polymer AC | polymer AD | polymer AE | polymer AF |
| results of analyzing conjugated diene polymer | | cis-1,4-bond content (%) | | 98.5 | 98.5 | 98.5 | 98 | 98.4 | 99 |
| | | number-average molecular weight (×10³) (Mn) | | 565 | 870 | 1250 | 905 | 840 | 540 |
| | | molecular weight distribution (Mw/Mn) | | 3.2 | 2.4 | 3.5 | 5.5 | 4 | 2 |

TABLE 1-continued

|  |  |  |  | Example A5 | Example A6 | Example A7 | Example A8 | Example A9 | Comparative Example A3 |
|---|---|---|---|---|---|---|---|---|---|
| specifications of method for manufacturing a conjugated diene polymer | polymerization catalyst composition | component (A) | rare earth element compound including at least one nitrogen atom | 1,3-butadiene Gd (*1) | 1,3-butadiene Gd (*1) | 1,3-butadiene Gd (*1) | 1,3-butadiene Gd (*1) | 1,3-butadiene Gd (*1) | 1,3-butadiene Gd (*1) |
| | | | conjugated diene monomer | | | | | | |
| | | component (B) | compound having a cyclopentadiene skeleton | 3-benzyl-indene | 2-phenyl-indene | 3-methyl-2-phenyl-indene | 3-benzyl-2-phenyl-indene | indene | — |
| | | component (C) | organometallic compound | diisobutyl aluminum hydride | diisobutyl aluminum hydride | diisobutyl aluminum hydride | diisobutyl aluminum hydride | diisobutyl aluminum hydride | diisobutyl aluminum hydride |
| | | component (D) | aluminoxane compound | TMAO | MMAO | MMAO | MMAO | MMAO | MMAO |
| | | component (E) | halogen compound | diethyl aluminum chloride | diethyl aluminum chloride | diethyl aluminum chloride | diethyl aluminum chloride | diethyl aluminum chloride | diethyl aluminum chloride |
| | | | ratio of component (B) to component (A) | 3 | 3 | 3 | 3 | 3 | — |
| | | | ratio of component (C) to component (A) | 12 | 12 | 12 | 12 | 12 | 12 |
| | | | ratio of aluminum in component (D) to rare earth element in component (A) | 500 | 500 | 500 | 500 | 500 | 500 |
| | | | ratio of component (E) to component (A) | 2 | 2 | 2 | 2 | 2 | 2 |
| | specifications of polymerization reaction process | | solvent | hexane | hexane | hexane | hexane | hexane | hexane |
| | | | reaction system | homogeneous | homogeneous | homogeneous | homogeneous | homogeneous | homogeneous |
| | | | reaction temperature (° C.) | 60 | 60 | 60 | 60 | 60 | 60 |
| | | | reaction pressure (atm) | ordinary pressure | ordinary pressure | ordinary pressure | ordinary pressure | ordinary pressure | ordinary pressure |
| | | | reaction time (min) | 60 | 60 | 60 | 60 | 60 | 180 |
| | | | yield as an amount (g) | 145 | 145 | 105 | 105 | 105 | 60 |
| | | | yield as a percentage (%) | 96 | 97 | 90 | 90 | 88 | 50 |
| | | | activity (kg/mol · time) | 12600 | 9650 | 9500 | 9500 | 8800 | 1300 |
| | | | conjugated diene polymer | polymer AG | polymer AH | polymer AI | polymer AJ | polymer AK | polymer AL |
| results of analyzing conjugated diene polymer | | | cis-1,4-bond content (%) | 98.5 | 98.6 | 98.5 | 98.7 | 98.4 | 96.5 |
| | | | number-average molecular weight (×10³) (Mn) | 870 | 550 | 540 | 570 | 530 | 905 |
| | | | molecular weight distribution (Mw/Mn) | 2.3 | 2.2 | 2.6 | 2.6 | 2.8 | 5.4 |

|  |  |  |  | Example A10 | Example A11 | Example A12 | Example A13 | Example A14 | Example A15 |
|---|---|---|---|---|---|---|---|---|---|
| specifications of method for manufacturing a conjugated diene polymer | polymerization catalyst composition | component (A) | rare earth element compound including at least one nitrogen atom | 1,3-butadiene Gd (*1) | 1,3-butadiene Gd (*1) | 1,3-butadiene Gd (*1) | 1,3-butadiene Gd (*1) | 1,3-butadiene Gd (*1) | 1,3-butadiene Gd (*1) |
| | | | conjugated diene monomer | | | | | | |
| | | component (B) | compound having a cyclopentadiene skeleton | 3-benzyl-indene | 3-benzyl-indene | 3-benzyl-indene | 3-benzyl-indene | 3-benzyl-indene | 3-benzyl-indene |
| | | component (C) | organometallic compound | diisobutyl aluminum hydride | diisobutyl aluminum hydride | diisobutyl aluminum hydride | diisobutyl aluminum hydride | diisobutyl aluminum hydride | diisobutyl aluminum hydride |
| | | component (D) | aluminoxane compound | PMAO | TMAO | TMAO | TMAO | TMAO | TMAO |
| | | component (E) | halogen compound | diethyl aluminum chloride | diethyl aluminum chloride | diethyl aluminum chloride | diethyl aluminum chloride | diethyl aluminum chloride | diethyl aluminum chloride |
| | | | ratio of component (B) to component (A) | 3 | 2 | 2 | 2 | 2 | 2 |
| | | | ratio of component (C) to component (A) | 12 | 15 | 15 | 15 | 15 | 15 |
| | | | ratio of aluminum in component (D) to rare earth element in component (A) | 500 | 67 | 67 | 67 | 67 | 67 |
| | | | ratio of component (E) to component (A) | 2 | 0.5 | 1 | 2 | 10 | 20 |

TABLE 1-continued

| | | | | | | | | | | |
|---|---|---|---|---|---|---|---|---|---|---|
| | specifications of polymerization reaction process | | solvent | hexane | hexane | hexane | hexane | hexane | hexane |
| | | | reaction system | homogeneous | homogeneous | homogeneous | homogeneous | homogeneous | homogeneous |
| | | | reaction temperature (° C.) | 60 | 50 | 50 | 50 | 50 | 50 |
| | | | reaction pressure (atm) | ordinary pressure | ordinary pressure | ordinary pressure | ordinary pressure | ordinary pressure | ordinary pressure |
| | | | reaction time (min) | 180 | 40 | 40 | 40 | 40 | 40 |
| | | | yield as an amount (g) | 30 | 66 | 66 | 67 | 66 | 65 |
| | | | yield as a percentage (%) | 20 | 94.3 | 94.3 | 95.7 | 94.3 | 92.9 |
| | | | activity (kg/mol · time) | 133 | 14140 | 14140 | 14360 | 14140 | 13930 |
| | | | conjugated diene polymer | polymer AM | polymer AN | polymer AO | polymer AP | polymer AQ | polymer AR |
| results of analyzing conjugated diene polymer | | | cis-1,4-bond content (%) | 98.4 | 96 | 98 | 99 | 98 | 96 |
| | | | number-average molecular weight (×10³) (Mn) | 737 | 550 | 530 | 540 | 550 | 540 |
| | | | molecular weight distribution (Mw/Mn) | 4.6 | 2.3 | 2.2 | 2.1 | 2.4 | 2.4 |

| | | | | Example A16 | Example A17 | Example A18 | Comparative Example A4 | Comparative Example A5 | Example A19 |
|---|---|---|---|---|---|---|---|---|---|
| specifications of method for manufacturing a conjugated diene polymer | | | conjugated diene monomer | 1,3-butadiene | 1,3-butadiene | 1,3-butadiene | 1,3-butadiene | 1,3-butadiene | 1,3-butadiene |
| | polymerization catalyst composition | component (A) | rare earth element compound including at least one nitrogen atom | Gd (*1) | Gd (*1) | Gd (*1) | Gd (*1) | Gd (*1) | Gd(In) (*2) |
| | | component (B) | compound having a cyclopentadiene skeleton | 3-benzyl-indene | 2-phenyl-indene | 2-phenyl-indene | — | — | 2-phenyl-indene |
| | | compound (C) | organometallic compound | diisobutyl aluminum hydride | diisobutyl aluminum hydride triisobutyl aluminum | diisobutyl aluminum hydride triisobutyl aluminum | diisobutyl aluminum hydride triisobutyl aluminum | diisobutyl aluminum hydride triisobutyl aluminum | diisobutyl aluminum hydride triisobutyl aluminum |
| | | compound (D) | aluminoxane compound | TMAO | MMAO | MMAO | MMAO | MMAO | MMAO |
| | | compound (E) | halogen compound | — | — | — | — | — | — |
| | | | ratio of component (B) to component (A) | 2 | 2 | 2 | — | — | 2 |
| | | | ratio of component (C) to component (A) | 15 | 44 | 88 | 44 | 88 | 44 |
| | | | ratio of aluminum in component (D) to rare earth element in component (A) | 67 | 400 | 400 | 400 | 400 | 400 |
| | | | ratio of component (E) to component (A) | — | — | — | — | — | — |
| | specifications of polymerization reaction process | | solvent | hexane | hexane | hexane | hexane | hexane | hexane |
| | | | reaction system | homogeneous | homogeneous | homogeneous | homogeneous | homogeneous | heterogeneous |
| | | | reaction temperature (° C.) | 50 | 50 | 50 | 50 | 50 | 50 |
| | | | reaction pressure (atm) | ordinary pressure | ordinary pressure | ordinary pressure | ordinary pressure | ordinary pressure | ordinary pressure |
| | | | reaction time (min) | 40 | 80 | 80 | 180 | 180 | 180 |
| | | | yield as an amount (g) | 60 | 94 | 65 | 60 | (trace amount) | 78 |
| | | | yield as a percentage (%) | 85.7 | 94 | 65 | 60 | — | 78 |
| | | | activity (kg/mol · time) | 12860 | 9700 | 9700 | 1300 | — | 2000 |
| | | | conjugated diene polymer | polymer AS | polymer AT | polymer AU | polymer AV | — | polymer AX |
| results of analyzing conjugated diene polymer | | | cis-1,4-bond content (%) | 95 | 97.2 | 97.2 | 96.5 | — | 97 |
| | | | number-average molecular weight (×10³) (Mn) | 560 | 550 | 870 | 1250 | — | 590 |
| | | | molecular weight distribution (Mw/Mn) | 2.4 | 1.9 | 2 | 5.4 | — | 3.4 |

| | | | | Example A20 | Example A21 |
|---|---|---|---|---|---|
| specifications of method for manufacturing a conjugated diene polymer | | | conjugated diene monomer | isoprene | isoprene |
| | polymerization catalyst composition | component (A) | rare earth element compound including at least one nitrogen atom | Gd(OtBu)₃ | Gd(StBu)₃ |
| | | component (B) | compound having a cyclopentadiene skeleton | 2-phenyl-indene | 2-phenyl-indene |

TABLE 1-continued

|  |  |  |  |  |
|---|---|---|---|---|
|  | component (C) | organometallic compound | diisobutyl aluminum hydride | diisobutyl aluminum hydride |
|  | component (D) | aluminoxane compound | MMAO | MMAO |
|  | component (E) | halogen compound | diethyl aluminum chloride | diethyl aluminum chloride |
|  | ratio of component (B) to component (A) |  | 2 | 2 |
|  | ratio of component (C) to component (A) |  | 10 | 10 |
|  | ratio of aluminum in component (D) to rare earth element in component (A) |  | 200 | 200 |
|  | ratio of component (E) to component (A) |  | 2 | 2 |
| specifications of polymerization reaction process | solvent |  | hexane | hexane |
|  | reaction system |  | homogeneous | homogeneous |
|  | reaction temperature (° C.) |  | 50 | 50 |
|  | reaction pressure (atm) |  | ordinary pressure | ordinary pressure |
|  | reaction time (min) |  | 60 | 60 |
|  | yield as an amount (g) |  | 116 | 116 |
|  | yield as a percentage (%) |  | 96 | 96 |
|  | activity (kg/mol · time) |  | 1900 | 1860 |
|  | conjugated diene polymer |  | polymer AY | polymer AZ |
| results of analyzing conjugated diene polymer | cis-1,4-bond content (%) |  | 97 | 96.5 |
|  | number-average molecular weight ($\times 10^3$) (Mn) |  | 553 | 552 |
|  | molecular weight distribution (Mw/Mn) |  | 3.3 | 3.4 |

*1: trisbistrimethylsilylamide gadolinium
*2: bis(2-phenylindenyl)gadolinium bis(dimethylsilylamide)

A comparison between Examples A1 to A21 and Comparative Examples A1 to A5 shows that the polymerization catalyst composition of this disclosure that includes a compound having a cyclopentadiene skeleton yields a higher catalytic activity than the polymerization catalyst composition that does not include this compound. Hence, Examples A1 to A21 obtained the desired effects of this application.

Furthermore, a comparison between Examples A1 to A21 and Comparative Example A2 shows that the polymerization catalyst composition of this disclosure yielded better solubility and higher catalytic activity in a high aliphatic hydrocarbon (hexane) than the known case of including a catalyst constituted by a metallocene-type cationic complex of a gadolinium compound as the main catalyst but not including a compound having a cyclopentadiene skeleton. Hence, Examples A1 to A21 obtained the desired effects of this application.

(Manufacturing of Isoprene-Butadiene Block Copolymers)

Isoprene-butadiene block copolymers were manufactured according to the following experimental points.

Example B1

First, 200 g of hexane solution including 30 g (0.44 mol) of isoprene were added into a thoroughly dried stainless-steel 1 L reactor.

On the other hand, 39.0 μmol of trisbistrimethylsilylamide gadolinium (Gd[N(SiMe$_3$)$_2$]$_3$) (component (A)), 78.0 μmol of 3-benzylindene (component (B)), and 0.39 mmol of diisobutyl aluminum hydride (component (C)) were added to a glass container in a glovebox under a nitrogen atmosphere and were dissolved in 30 mL of hexane. MMAO (MMAO-3A, produced by Tosoh Finechem Corporation) (component (D)) was then added to the glass container, with the ratio in moles of the aluminum in the MMAO to the gadolinium in the trisbistrimethylsilylamide gadolinium being 100. Then, 78.0 μmol of diethyl aluminum chloride (component (E-1)) were further added to yield the polymerization catalyst composition.

Subsequently, the polymerization catalyst composition was removed from the glovebox, and an amount of polymerization catalyst composition that included 15.0 μmol of gadolinium was added to a 1 L reactor including isoprene. This reaction system was maintained at 50° C. for 90 minutes, and a polymerization reaction of isoprene was carried out.

Next, 130 g of hexane solution including 30 g (0.56 mol) of 1,3-butadiene were added to the polymer reaction solution. This reaction system was maintained again at 50° C. for 90 minutes, and a polymerization reaction of 1,3-butadiene was carried out.

Subsequently, the polymerization reaction was stopped by adding 2 mL of isopropanol to the reaction system. Furthermore, the reaction product was precipitated and separated by adding a large amount of methanol to the reactor. The result was then vacuum-dried at 60° C. to obtain polymer BA (yield: 60 g).

Throughout this manufacturing, no aromatic hydrocarbon (toluene or the like) was used.

Example B2

A polymerization catalyst composition was prepared and a polymerization reaction was carried out in the same way as in Example B1, except for setting the amount of diisobutyl aluminum hydride to 0.55 mmol and for adopting the composition indicated in Table 2, to obtain polymer BB (yield: 60 g).

Example B3

First, 260 g of hexane solution including 45 g (0.66 mol) of isoprene were added into a thoroughly dried stainless-steel 1 L reactor.

On the other hand, 29.0 μmol of trisbistrimethylsilylamide gadolinium (Gd[N(SiMe$_3$)$_2$]$_3$) (component (A)), 58.0 μmol of 3-benzylindene (component (B)), and 0.39 mmol of diisobutyl aluminum hydride (component (C)) were added to a glass container in a glovebox under a nitrogen atmosphere and were dissolved in 25 mL of hexane. MMAO (MMAO-3A, produced by Tosoh Finechem Corporation) (component (D)) was then added to the glass container, with the ratio in moles of the aluminum in the MMAO to the gadolinium in the trisbistrimethylsilylamide gadolinium being 100. Then, 58.0 μmol of diethyl aluminum chloride (component (E-1)) were further added to yield the polymerization catalyst composition.

Subsequently, the polymerization catalyst composition was removed from the glovebox, and an amount of polymerization catalyst composition that included 22.5 μmol of gadolinium was added to a 1 L reactor including isoprene. This reaction system was maintained at 50° C. for 90 minutes, and a polymerization reaction of isoprene was carried out.

Next, 65 g of hexane solution including 15 g (0.28 mol) of 1,3-butadiene were added to the polymer reaction solution. This reaction system was maintained again at 50° C. for 90 minutes, and a polymerization reaction of 1,3-butadiene was carried out.

Subsequently, the polymerization reaction was stopped by adding 2 mL of isopropanol to the reaction system. Furthermore, the reaction product was precipitated and separated by adding a large amount of methanol to the reactor. The result was then vacuum-dried at 60° C. to obtain polymer BC (yield: 60 g).

Throughout this manufacturing, no aromatic hydrocarbon (toluene or the like) was used.

Example B4

A polymerization catalyst composition was prepared and a polymerization reaction was carried out in the same way as in Example B1, except for setting the ratio of isoprene to 1,3-butadiene to 80:20, using 1,3-butadiene as the first monomer and isoprene as the second monomer, and adopting the composition and conditions indicated in Table 2, to obtain polymer BD (yield: 60 g).

Example B5

A polymerization catalyst composition was prepared and a polymerization reaction was carried out in the same way as in Example B 1, except for setting the ratio of the isoprene monomer to 1,3-butadiene to 88:12, using TMAO (TMAO341, produced by Tosoh Finechem Corporation) instead of MMAO, setting the polymerization reaction conditions to be those indicated in Table 2, and adopting the composition and conditions indicated in Table 2, to obtain polymer BE (yield: 60 g).

Example B6

A polymerization catalyst composition was prepared and a polymerization reaction was carried out in the same way as in Example B5, except for setting the polymerization reaction conditions to be those indicated in Table 2, to obtain polymer BF (yield: 60 g).

Example B7

A polymerization catalyst composition was prepared and a polymerization reaction was carried out in the same way as in Example B 1, except for using 2-phenylindene instead of 3-benzylindene, using PMAO (TMAO-211, produced by Tosoh Finechem Corporation) instead of MMAO, and adopting the composition and conditions indicated in Table 2, to obtain polymer BG (yield: 60 g).

Example B8

A polymerization catalyst composition was prepared and a polymerization reaction was carried out in the same way as in Example B1, except for using 3-methyl-2-phenylindene instead of 3-benzylindene, to obtain polymer BH (yield: 60 g).

Example B9

A polymerization catalyst composition was prepared and a polymerization reaction was carried out in the same way as in Example B1, except for using indene instead of 3-benzylindene, to obtain polymer BI (yield: 60 g).

Comparative Example B1

A polymerization catalyst composition was prepared and a polymerization reaction was carried out in the same way as in Example B1, except for using Neodymium Versatate (NEODYME VERSATATE 50, produced by Rhodia) instead of trisbistrimethylsilylamide gadolinium, not using 3-benzylindene, using PMAO (TMAO-211, produced by Tosoh Finechem Corporation) instead of MMAO, and adopting the composition and conditions indicated in Table 2, to obtain polymer BJ (yield: 60 g).

Comparative Example B2

A polymerization catalyst composition was prepared and a polymerization reaction was carried out in the same way as in Example B1, except for not using 3-benzylindene, using bis(2-diphenylphosphinophenyl)amine (PNP ligand), not using diethyl aluminum chloride, and adopting the composition and conditions indicated in Table 2, to obtain polymer BK (yield: 60 g).

Comparative Example B3

A polymerization catalyst composition was prepared and a polymerization reaction was carried out in the same way as in Example B 1, except for using bis(2-phenylindenyl) gadolinium bis(dimethylsilylamide) instead of trisbistrimethylsilylamide gadolinium, but no polymer was obtained.

Example B10

A polymerization catalyst composition was prepared and a polymerization reaction was carried out in the same way as in Example B1, except for using PMAO instead of MMAO and for adopting the composition and conditions indicated in Table 2, to obtain polymer BM (yield: 60 g).

Example B11

A polymerization catalyst composition was prepared and a polymerization reaction was carried out in the same way as in Example B1, except for not using diethyl aluminum chloride, to obtain polymer BN (yield: 60 g).

Example B12

A polymerization catalyst composition was prepared and a polymerization reaction was carried out in the same way as in Example B1, except for setting the amount of diethyl aluminum chloride to 19.5 μmol and for adopting the composition indicated in Table 2, to obtain polymer BO (yield: 60 g).

Example B13

A polymerization catalyst composition was prepared and a polymerization reaction was carried out in the same way as in Example B1, except for setting the amount of diethyl aluminum chloride to 39.0 μmol and for adopting the composition indicated in Table 2, to obtain polymer BP (yield: 60 g).

Example B14

A polymerization catalyst composition was prepared and a polymerization reaction was carried out in the same way as in Example B1, except for setting the amount of diethyl aluminum chloride to 390 μmol and for adopting the composition indicated in Table 2, but no polymer was obtained.

Example B15

A polymerization catalyst composition was prepared and a polymerization reaction was carried out in the same way as in Example B1, except for setting the amount of diethyl aluminum chloride to 780 μmol and for adopting the composition indicated in Table 2, but no polymer was obtained.

Details on the preparation of the polymerization catalyst composition and the manufacturing of the isoprene-butadiene block copolymer in each Example B and Comparative Example B are listed in Table 2.

The catalytic activity of the polymerization catalyst composition during the manufacturing was calculated by the following formula.

(yield (kg))/((amount of component (A) used (mol))×(reaction time (hours)))

(Analysis of Isoprene-Butadiene Block Copolymers)

Analyses (1) and (2) were performed on the polymers B obtained as above.

(1) Analysis of Microstructure (Cis-1,4-Bond Content (%) and 3,4-Vinyl Bond Content (%) of Portion Derived from Isoprene, Cis-1,4-Bond Content (%) and Vinyl Bond Content (%) of Portion Derived from Butadiene)

For each of the obtained polymers B, a $^1$H-NMR and a $^{13}$C-NMR spectrum were obtained using NMR (AVANCE 600 produced by Bruker).

For the portion derived from isoprene, from the integration ratio of the peaks obtained by measuring $^1$H-NMR and $^{13}$C-NMR ($^1$H-NMR: δ 4.6-4.8 (=CH$_2$ of 3,4-vinyl unit), 5.0-5.2 (—CH= of 1,4-unit), $^{13}$C-NMR: δ23.4 (1,4-cys unit), 15.9 (1,4-trans unit), 18.6 (3,4-unit)), the cis-1,4-bond content (%) and the 3,4-vinyl bond content (%) were calculated.

For the portion derived from butadiene, from the integration ratio of the peaks obtained by measuring $^1$H-NMR and $^{13}$C-NMR ($^1$H-NMR: δ 4.8-5.0 (=CH$_2$ of 1,2-vinyl unit), 5.2-5.4 (—CH= of 1,4-unit), $^{13}$C-NMR: δ 27.4 (1,4-cys unit), 32.7 (1,4-trans unit)), the cis-1,4-bond content (%) and the vinyl bond content (%) were calculated.

(2) Analysis of Number-Average Molecular Weight (Mn) and Molecular Weight Distribution (Mw/Mn)

By Gel Permeation Chromatography (GPC) (HLC-8220 GPC produced by Tosoh Corporation; two columns: TSKgel GMH$_{XL}$ produced by Tosoh Corporation; detector: differential refractometer (RI)), with monodisperse polystyrene as a reference, the number-average molecular weight (Mn) and the molecular weight distribution (Mw/Mn) of the polymers B in terms of polystyrene were calculated. The measurement temperature was 40° C., and the eluting solvent was THF.

Details on the analysis results of the isoprene-butadiene block copolymer in each Example B and Comparative Example B are listed in Table 2.

TABLE 2

| | | | Example B1 | Example B2 | Example B3 | Example B4 | Example B5 | Example B6 | Example B7 |
|---|---|---|---|---|---|---|---|---|---|
| specifications of method for manufacturing an isoprene-butadiene block copolymer | monomer preparation process | ratio of isoprene to 1,3-butadiene (mass) | 50/50 | 50/50 | 75/25 | 80/20 | 88/12 | 88/12 | 50/50 |
| | catalyst system preparation process polymerization catalyst composition | component (A) rare earth element compound including at least one nitrogen atom | Gd (*1) | Gd (*1) | Gd (*1) | Gd (*1) | Gd (*1) | Gd (*1) | Gd (*1) |
| | | component (B) compound having a cyclopentadiene skeleton | 3-benzyl-indene | 3-benzyl-indene | 3-benzyl-indene | 3-benzyl-indene | 3-benzyl-indene | 3-benzyl-indene | 2-phenyl-indene |
| | | component (C) organometallic compound | diisobutyl aluminum hythide | diisobutyl aluminum hythide | diisobutyl aluminum hythide | diisobutyl aluminum hythide | diisobutyl aluminum hythide | diisobutyl aluminum hythide | diisobutyl aluminum hythide |
| | | component (D) aluminoxane compound | MMAO | MMAO | MMAO | MMAO | TMAO | TMAO | PMAO |
| | | component (E) halogen compound | diethyl aluminum chloride | diethyl aluminum chloride | diethyl aluminum chloride | diethyl aluminum chloride | diethyl aluminum chloride | diethyl aluminum chloride | diethyl aluminum chloride |
| | | ratio of component (B) to component (A) (mol) | 2 | 2 | 2 | 2 | 2 | 2 | 2 |

TABLE 2-continued

|  |  |  |  |  |  |  |  |  |  |
|---|---|---|---|---|---|---|---|---|---|
|  |  | ratio of component (C) to component (A) (mol) | 10 | 14 | 10 | 60 | 50 | 250 | 10 |
|  |  | ratio of aluminum in component (D) to rare earth element in component (A) (mol) | 100 | 100 | 100 | 250 | 100 | 600 | 100 |
|  |  | ratio of component (E) to component (A) (mol) | 2 | 2 | 2 | 2 | 2 | 2 | 2 |
|  | copolymerization reaction process | solvent | hexane | hexane | hexane | hexane | hexane | hexane | hexane |
|  |  | reaction system | homogeneous | homogeneous | homogeneous | homogeneous | homogeneous | homogeneous | homogeneous |
|  |  | amount of catalyst (component (A)) (mmol) in 100 g of first monomer | 0.05 | 0.05 | 0.05 | 0.03 | 0.04 | 0.005 | 0.05 |
|  | first polymerization reaction process | reaction temperature (° C.) | 50 | 50 | 50 | 50 | 80 | 65 | 50 |
|  |  | first monomer | isoprene | isoprene | isoprene | 1,3-butadiene | isoprene | isoprene | isoprene |
|  |  | reaction pressure (atm) | ordinary pressure | ordinary pressure | ordinary pressure | ordinary pressure | ordinary pressure | ordinary pressure | ordinary pressure |
|  |  | reaction time (min) | 90 | 90 | 90 | 90 | 62.5 | 45 | 90 |
|  | second polymerization reaction process | reaction temperature (° C.) | 50 | 50 | 50 | 50 | 80 | 65 | 50 |
|  |  | second monomer | 1,3-butadiene | 1,3-butadiene | 1,3-butadiene | isoprene | 1,3-butadiene | 1,3-butadiene | 1,3-butadiene |
|  |  | reaction pressure (atm) | ordinary pressure | ordinary pressure | ordinary pressure | ordinary pressure | ordinary pressure | ordinary pressure | ordinary pressure |
|  |  | reaction time (min) | 90 | 90 | 90 | 90 | 62.5 | 45 | 90 |
|  |  | yield as an amount (g) | 60 | 60 | 60 | 60 | 60 | 60 | 60 |
|  |  | yield as a percentage (%) | 100 | 100 | 100 | 100 | 100 | 100 | 100 |
|  |  | activity (kg/mol · time) | 1930 | 1930 | 1930 | 9700 | 3000 | 3000 | 700 |
|  |  | isoprene-butadiene block copolymer | polymer BA | polymer BB | polymer BC | polymer BD | polymer BE | polymer BF | polymer BG |
| results of analyzing isoprene-butadiene block copolymer | cis-1,4-bond content of portion derived from isoprene (%) |  | 98.1 | 98.1 | 98.4 | 99 | 98.3 | 98 | 98.3 |
|  | 3,4-vinyl bond content of portion derived from isoprene (%) |  | 1.9 | 1.9 | 1.6 | 1 | 1.7 | 2 | 1 7 |
|  | cis-1,4-bond content of portion derived from butadiene (%) |  | 99.1 | 99.1 | 99.1 | 99.1 | 99 | 98.8 | 98 |
|  | vinyl bond content of portion derived from butadiene (%) |  | 03 | 0.2 | 0.3 | 0.2 | 02 | 0.5 | 0.5 |
|  | number-average molecular weight (×10³) (Mn) |  | 1050 | 1140 | 1100 | 650 | 550 | 520 | 1100 |
|  | molecular weight distribution (Mw/Mn) |  | 3 | 3 | 3 | 3 | 3 | 4 | 3 |

|  |  |  |  | Example B8 | Example B9 | Comparative Example B1 | Comparative Example B2 | Comparative Example B3 | Example B10 | Example B11 |
|---|---|---|---|---|---|---|---|---|---|---|
| specifications of method for manufacturing an isoprene-butadiene block copolymer | monomer preparation process | ratio of isoprene to 1,3-butadiene (mass) |  | 50/50 | 50/50 | 50/50 | 50/50 | 50/50 | 50/50 | 50/50 |
|  | catalyst system preparation process polymerization catalyst composition | component (A) | rare earth element compound including at least or nitrogen atom | Gd (*1) | Gd (*1) | Nd (*3) | Gd (*1) | Gd(In) (*2) | Gd (*1) | Gd (*1) |
|  |  | component (B) | compound having a cyclopentadiene skeleton | 3-methyl-2-plenyl-indene | indene | — | PNP (*4) | — | 3-benzyl-indene | 3-benzyl-indene |
|  |  | component (C) | organometallic compound | diisobutyl aluminum hydride | diisobutyl aluminum hydride | diisobutyl aluminum hydride | diisobutyl aluminum hydride | diisobutyl aluminum hydride | diisobutyl aluminum hydride | diisobutyl aluminum hydride |
|  |  | component (D) | aluminoxane compound | MMAO | MMAO | PMAO | — | — | PMAO | MMAO |

TABLE 2-continued

| | | | | | | | | | |
|---|---|---|---|---|---|---|---|---|---|
| | | component (E) | halogen compound | diethyl aluminum chloride | diethyl aluminum chloride | diethyl aluminum chloride | — | diethyl aluminum chloride | diethyl aluminum chloride | — |
| | | ratio of component (B) to component (A) (mol) | | 2 | 2 | 0 | 1 | 0 | 2 | 2 |
| | | ratio of component (C) to component (A) (mol) | | 50 | 50 | 14 | 10 | 10 | 10 | 10 |
| | | ratio of aluminum in component (D) to rare earth element in component (A) (mol) | | 100 | 100 | 100 | 100 | 100 | 100 | 100 |
| | | ratio of component (E) to component (A) (mol) | | 2 | 2 | 2 | 0 | 2 | 2 | 2 |
| | copolymerization reaction process | solvent | | hexane | lexare | hexane | hexane | hexane | hexane | lexare |
| | | reaction system | | homogeneous | homogeneous | homogeneous | homogeneous | inhomogeneous | homogeneous | homogeneous |
| | | amount of catalyst (component (A)) (mmol) in 100 g of first monomer) | | 0.05 | 0.05 | 0.05 | 0.1 | 0.1 | 0.05 | 0.05 |
| | first polymerization reaction process | reaction temperature (° C.) | | 50 | 50 | 65 | room temperature | room temperature | 50 | 50 |
| | | first monomer | | isoprene | isoprene | isoprene | isoprere | isoprene | isoprene | isoprene |
| | | reaction pressure (atm) | | ordinary pressure | ordinary pressure | ordinary pressure | ordinary pressure | ordinary pressure | ordinary pressure | ordinary pressure |
| | | reaction time (min) | | 90 | 90 | 75 | 450 | 30 | 90 | 90 |
| | second polymerization reaction process | reaction temperature (° C.) | | 50 | 50 | 65 | room temperature | room temperature | 50 | 50 |
| | | second monomer | | 1,3-butadiene | 1,3-butadiene | 1,3-butadiene | 1,3-butadiene | 1,3-butadiene | 1,3-butadiene | 1,3-butadiene |
| | | reaction pressure (atm) | | ordinary pressure | ordinary pressure | ordinary pressure | ordinary pressure | ordinary pressure | ordinary pressure | ordinary pressure |
| | | reaction time (min) | | 90 | 90 | 75 | 450 | 30 | 90 | 90 |
| | | yield as an amount (g) | | 60 | 60 | 60 | 60 | 0 | 60 | 60 |
| | | yield as a percentage (%) | | 100 | 100 | 100 | 100 | 0 | 100 | 100 |
| | | activity (kg/mol · time) | | 1800 | 1750 | 130 | 80 | — | 800 | 300 |
| | | isoprene-butadiene block copolymer | | polymer BH | polymer BI | polymer BJ | polymer BK | — | polymer BM | polymer BN |
| results of analyzing isoprere-butadiene block copolymer | cis-1,4-bond content of portion derived from isoprene (%) | | | 98.2 | 98 | 96.8 | 98.5 | ND. | 98.3 | 97 |
| | 3,4-vinyl bond content of portion derived from isoprene (%) | | | 1.8 | 2 | 2.4 | 1.5 | ND. | 1.7 | 3 |
| | cis-1,4-bond content of portion derived from butadiene (%) | | | 98 | 98 | 942 | 97 | ND. | 99 | 95 |
| | vinyl bond content of portion derived from butadiene (%) | | | 0.6 | 0.5 | 0.4 | 0.3 | ND. | 0.5 | 2 |
| | number-average molecular weight (×10³) (Mn) | | | 660 | 550 | 224 | 1000 | ND. | 1110 | 1000 |
| | molecular weight distribution (Mw/Mn) | | | 3 | 3 | 2 | 3 | ND. | 3 | 6 |

| | | | | | Example B12 | Example B13 | Example B14 | Example B15 |
|---|---|---|---|---|---|---|---|---|
| specifications of method for manufacturing an isoprene-butadiene block copolymer | monomer preparation process | ratio of isoprene to 1,3-butadiene (mass) | | | 50/50 | 50/50 | 50/50 | 50/50 |
| | catalyst system preparation process | component (A) | rare earth element compound including at least or nitrogen atom | | Gd (*1) | Gd (*1) | Gd (*1) | Gd (*1) |
| | polymerization catalyst composition | component (B) | compound having a cyclopentadiene skeleton | | 3-benzyl-indene | 3-benzyl-indene | 3-benzyl-indene | 3-benzyl-indene |
| | | component (C) | organometallic compound | | diisobutyl aluminum hydride | diisobutyl aluminum hydride | diisobutyl aluminum hydride | diisobutyl aluminum hydride |
| | | component (D) | aluminoxane compound | | MMAO | MMAO | MMAO | MMAO |
| | | component (E) | halogen compound | | diethyl aluminum chloride | diethyl aluminum chloride | diethyl aluminum chloride | diethyl aluminum chloride |

TABLE 2-continued

| | | | | | |
|---|---|---|---|---|---|
| | | ratio of component (B) to component (A) (mol) | 2 | 2 | 2 | 2 |
| | | ratio of component (C) to component (A) (mol) | 10 | 10 | 10 | 10 |
| | | ratio of aluminum in component (D) to rare earth element in component (A) (mol) | 100 | 100 | 100 | 100 |
| | | ratio of component (E) to component (A) (mol) | 0.5 | 1 | 10 | 20 |
| copolymerization reaction process | | solvent | hexame | hexame | hexane | hexane |
| | | reaction system | homogeneous | homogeneous | homogeneous | homogereous |
| | | amount of catalyst (component (A) (mmol) in 100 g of first monomer) | 0.05 | 0.05 | 0.05 | 0.05 |
| | first polymerization reaction process | reaction temperature (° C.) | 50 | 50 | 50 | 50 |
| | | first monomer | isoprere | isoprere | isoprene | isoprene |
| | | reaction pressure (atm) | ordinary pressure | ordinary pressure | ordinary pressure | ordinary pressure |
| | | reaction tine (min) | 90 | 90 | 90 | 90 |
| | second polymerization reaction process | reaction temperature (° C.) | 50 | 50 | 50 | 50 |
| | | second monomer | 1,3-butadiere | 1,3-butadiere | 1,3-butadiene | 1,3-butadiene |
| | | reaction pressure (atm) | ordinary pressure | ordinary pressure | ordinary pressure | ordinary pressure |
| | | reaction time (min) | 90 | 90 | 90 | 90 |
| | | yield as an amount (g) | 60 | 60 | 0 | 0 |
| | | yield as a percentage (%) | 100 | 100 | 0 | 0 |
| | | activity (kg/mol · time) | 500 | 550 | — | — |
| | | isoprene-butadiene block copolymer | polymer BO | polymer BP | — | — |
| results of analyzing isoprene-butadiere block copolymer | | cis-1,4-bond content of portion derived from isoprene (%) | 97.8 | 97.9 | ND. | ND. |
| | | 3,4-vinyl bond content of portion derived from isoprene (%) | 2.2 | 2.1 | ND. | ND. |
| | | cis-1,4-bond content of portion derived from butadiene (%) | 95 | 96 | ND. | ND. |
| | | vinyl bond content of portion derived from butadiene (%) | 2 | 2 | ND. | ND. |
| | | number-average molecular weight ($\times 10^3$) (Mn) | 980 | 700 | ND. | ND. |
| | | molecular weight distribution (Mw/Mn) | 4 | 4 | ND. | ND. |

*1: trisbistrimethylsilylamide gadolinium
*2: bis(2-phenylindenyl)gadolinium bis(dimethylsilylamide)
*3: Neodymium Versatate
*4: bis(2-diphenylphosphinophenyl)amine A comparison between Examples B1 to B15 and Comparative Examples B1 to B3 shows that with the method for manufacturing an isoprene-butadiene block copolymer of this disclosure, an isoprene-butadiene block copolymer can be manufactured while reducing the burden on the environment and manufacturing costs.

In particular, a comparison between Example B1 and Comparative Example B1 shows that with the method for manufacturing of this disclosure, the effect of increasing the catalytic activity in the reaction system and the effect of increasing the cis-1,4-bond content are obtained. A comparison between Example B1 and Comparative Example B2 shows that with the method for manufacturing of this disclosure, the effect of increasing the catalytic activity in the reaction system is obtained. A comparison between Example B1 and Comparative Example B3 shows that with the method for manufacturing of this disclosure, an aromatic hydrocarbon that is poisonous and relatively expensive is not absolutely necessary as the solvent of the polymerization reaction, and the effect of reducing the burden on the environment and manufacturing costs can be obtained.

(Manufacturing of Isoprene-Butadiene Random Copolymers)

Isoprene-butadiene random copolymers were manufactured according to the following experimental points.

Example C1

First, 400 g of hexane solution including 15 g (0.22 mol) of isoprene and 45 g (0.84 mol) of 1,3-butadiene were added into a thoroughly dried stainless-steel 1 L reactor.

On the other hand, 39.0 µmol of trisbistrimethylsilylamide gadolinium (Gd[N(SiMe$_3$)$_2$]$_3$) (component (A)), 78.0 µmol of 3-benzylindene (component (B)), and 0.45 mmol of diisobutyl aluminum hydride (component (C)) were added to a glass container in a glovebox under a nitrogen atmosphere and were dissolved in 30 mL of hexane. MMAO (MMAO-3A, produced by Tosoh Finechem Corporation) (component (D)) was then added to the glass container, with the ratio in moles of the aluminum in the MMAO to the gadolinium in the trisbistrimethylsilylamide gadolinium being 100. Then, 78.0 µmol of diethyl aluminum chloride (component (E-1)) were further added to yield the polymerization catalyst composition.

Subsequently, the polymerization catalyst composition was removed from the glovebox, and an amount of polymerization catalyst composition that included 30.0 µmol of gadolinium was added to a 1 L reactor including isoprene and 1,3-butadiene. This reaction system was maintained at 50° C. for 90 minutes, and a polymerization reaction of isoprene and 1,3-butadiene (random polymerization reaction) was carried out.

Subsequently, the polymerization reaction was stopped by adding 2 mL of isopropanol to the reaction system. Furthermore, the reaction product was precipitated and separated by adding a large amount of methanol to the reactor. The result was then vacuum-dried at 60° C. to obtain polymer CA (yield: 60 g).

Throughout this manufacturing, no aromatic hydrocarbon (toluene or the like) was used.

Example C2

A polymerization catalyst composition was prepared and a polymerization reaction was carried out in the same way as in Example C1, except for setting the ratio of the isoprene monomer to 1,3-butadiene to 50:50, to obtain polymer CB (yield: 60 g).

Example C3

A polymerization catalyst composition was prepared and a polymerization reaction was carried out in the same way as in Example C1, except for setting the ratio of the isoprene monomer to 1,3-butadiene to 25:75, to obtain polymer CC (yield: 60 g).

Example C4

A polymerization catalyst composition was prepared and a polymerization reaction was carried out in the same way as in Example C2, except for using TMAO (TMAO341, produced by Tosoh Finechem Corporation) instead of MMAO and for adopting the composition and conditions indicated in Table 3, to obtain polymer CD (yield: 60 g).

Example C5

A polymerization catalyst composition was prepared and a polymerization reaction was carried out in the same way as in Example C2, except for using 2-phenylindene instead of 3-benzylindene and for adopting the composition and conditions indicated in Table 3, to obtain polymer CE (yield: 60 g).

Example C6

A polymerization catalyst composition was prepared and a polymerization reaction was carried out in the same way as in Example C2, except for using 3-methyl-2-phenylindene instead of 3-benzylindene and for adopting the composition and conditions indicated in Table 3, to obtain polymer CF (yield: 60 g).

Example C7

A polymerization catalyst composition was prepared and a polymerization reaction was carried out in the same way as in Example C2, except for using 3-benzyl-2-phenylindene instead of 3-benzylindene and for adopting the composition and conditions indicated in Table 3, to obtain polymer CG (yield: 60 g).

Example C8

A polymerization catalyst composition was prepared and a polymerization reaction was carried out in the same way as in Example C2, except for using indene instead of 3-benzylindene and for adopting the composition and conditions indicated in Table 3, to obtain polymer CH (yield: 60 g).

Example C9

A polymerization catalyst composition was prepared and a polymerization reaction was carried out in the same way as in Example C2, except for using Neodymium Versatate (NEODYME VERSATATE 50, produced by Rhodia) instead of trisbistrimethylsilylamide gadolinium, to obtain polymer CI (yield: 60 g).

Comparative Example C1

A polymerization catalyst composition was prepared and a polymerization reaction was carried out in the same way as in Example C2, except for not using 3-benzylindene, to obtain polymer CJ (yield: 60 g).

Comparative Example C2

A polymerization catalyst composition was prepared and a polymerization reaction was carried out in the same way as in Example C2, except for using bis(2-phenylindenyl)gadolinium bis(dimethylsilylamide) instead of trisbistrimethylsilylamide gadolinium, not using 3-benzylindene, and adopting the composition and conditions indicated in Table 3, but no polymer was obtained.

Example C10

A polymerization catalyst composition was prepared and a polymerization reaction was carried out in the same way as in Example C2, except for using PMAO (TMAO-211, produced by Tosoh Finechem Corporation) instead of MMAO and for adopting the composition and conditions indicated in Table 3, to obtain polymer CL (yield: 60 g).

Example C11

A polymerization catalyst composition was prepared and a polymerization reaction was carried out in the same way as in Example C2, except for not using diethyl aluminum chloride, to obtain polymer CM (yield: 60 g).

Example C12

A polymerization catalyst composition was prepared and a polymerization reaction was carried out in the same way as in Example C2, except for setting the amount of diethyl aluminum chloride to 19.5 µmol and for adopting the composition indicated in Table 3, to obtain polymer CN (yield: 60 g).

Example C13

A polymerization catalyst composition was prepared and a polymerization reaction was carried out in the same way as in Example C2, except for setting the amount of diethyl aluminum chloride to 39.0 µmol and for adopting the composition indicated in Table 3, to obtain polymer CO (yield: 60 g).

Example C14

A polymerization catalyst composition was prepared and a polymerization reaction was carried out in the same way as in Example C2, except for setting the amount of diethyl aluminum chloride to 390 μmol and for adopting the composition indicated in Table 3, but no polymer was obtained.

Example C15

A polymerization catalyst composition was prepared and a polymerization reaction was carried out in the same way as in Example C2, except for setting the amount of diethyl aluminum chloride to 780 μmol and for adopting the composition indicated in Table 3, but no polymer was obtained.

Details on the preparation of the polymerization catalyst composition and the manufacturing of the isoprene-butadiene random copolymer in each Example C and Comparative Example C are listed in Table 3.

The catalytic activity of the polymerization catalyst composition during the manufacturing was calculated by the following formula.

(yield (kg))/((amount of component (A) used (mol))×(reaction time (hours)))

(Analysis of Isoprene-Butadiene Random Copolymers)

Analyses (1) and (2) were performed on the polymers C obtained as above.

(1) Analysis of Microstructure (Cis-1,4-Bond Content (%) and 3,4-Vinyl Bond Content (%) of Portion Derived from Isoprene, Cis-1,4-Bond Content (%) and Vinyl Bond Content (%) of Portion Derived from Butadiene)

For each of the obtained polymers C, a $^1$H-NMR and a $^{13}$C-NMR spectrum were obtained using NMR (AVANCE 600 produced by Bruker).

For the portion derived from isoprene, from the integration ratio of the peaks obtained by measuring $^1$H-NMR and $^{13}$C-NMR ($^1$H-NMR: δ 4.6-4.8 (=CH$_2$ of 3,4-vinyl unit), 5.0-5.2 (—CH= of 1,4-unit), $^{13}$C-NMR: δ 23.4 (1,4-cys unit), 15.9 (1,4-trans unit), 18.6 (3,4-unit)), the cis-1,4-bond content (%) and the 3,4-vinyl bond content (%) were calculated.

For the portion derived from butadiene, from the integration ratio of the peaks obtained by measuring $^1$H-NMR and $^{13}$C-NMR ($^1$H-NMR: δ 4.8-5.0 (=CH$_2$ of 1,2-vinyl unit), 5.2-5.4 (—CH= of 1,4-unit), $^{13}$C-NMR: δ 27.4 (1,4-cys unit), 32.7 (1,4-trans unit)), the cis-1,4-bond content (%) and the vinyl bond content (%) were calculated.

(2) Analysis of Number-Average Molecular Weight (Mn) and Molecular Weight Distribution (Mw/Mn)

By Gel Permeation Chromatography (GPC) (HLC-8220 GPC produced by Tosoh Corporation; two columns: TSKgel GMH$_{XL}$ produced by Tosoh Corporation; detector: differential refractometer (RI)), with monodisperse polystyrene as a reference, the number-average molecular weight (Mn) and the molecular weight distribution (Mw/Mn) of the polymers C in terms of polystyrene were calculated. The measurement temperature was 40° C., and the eluting solvent was THF.

Details on the analysis results of the isoprene-butadiene random copolymer in each Example C and Comparative Example C are listed in Table 3.

TABLE 3

| | | | | Example C1 | Example C2 | Example C3 | Example C4 | Example C5 | Example C6 | Example C7 |
|---|---|---|---|---|---|---|---|---|---|---|
| specifications of method for manufacturing an isoprene-butadiene random copolymer | monomer preparation process | | ratio of isoprene to 1,3-butadiene (mass) | 25/75 | 50/50 | 75/25 | 50/50 | 50/50 | 50/50 | 50/50 |
| | catalyst system preparation process | component (A) | rare earth element compound including at least one nitrogen atom | Gd (*1) | Gd (*1) | Gd (*1) | Gd (*1) | Gd (*1) | Gd (*1) | Gd (*1) |
| | polymerization catalyst composition | component (B) | compound having a cyclopentadiene skeleton | 3-benzyl-indene | 3-benzyl-indene | 3-benzyl-indene | 3-benzyl-indene | 2-phenyl-indene | 3-methyl-2-phenyl-indene | 3-benzyl-2-phenyl-indene |
| | | component (C) | organometallic compound | diisobutyl aluminum hydride | diisobutyl aluminum hydride | diisobutyl aluminum hydride | diisobutyl aluminum hydride | diisobutyl aluminum hydride | diisobutyl aluminum hydride | diisobutyl aluminum hydride |
| | | component (D) | aluminoxane compound | MMAO | MMAO | MMAO | TMAO | MMAO | MMAO | MMAO |
| | | component (E) | halogen compound | diethyl aluminum chloride | diethyl aluminum chloride | diethyl aluminum chloride | diethyl aluminum chloride | diethyl aluminum chloride | diethyl aluminum chloride | diethyl aluminum chloride |
| | | | ratio of component (B) to component (A) (mol) | 2 | 2 | 2 | 2 | 2 | 2 | 2 |
| | | | ratio of component (C) to component (A) (mol) | 10 | 10 | 10 | 10 | 10 | 10 | 10 |
| | | | ratio of aluminum in component (D) to rare earth element in component (A) (mol) | 100 | 100 | 100 | 100 | 100 | 100 | 100 |
| | | | ratio of component (E) to component (A) (mol) | 2 | 2 | 2 | 2 | 2 | 2 | 2 |
| | copolymerization reaction process | | solvent | hexane | hexane | hexane | hexane | hexane | hexane | hexane |
| | | | reaction system | homogeneous | homogeneous | homogeneous | homogeneous | homogeneous | homogeneous | homogeneous |
| | | | amount of catalyst (component (A) (mmol) in 100 g of first monomer) | 0.05 | 0.05 | 0.05 | 0.03 | 0.04 | 0.05 | 0.05 |
| | | | reaction temperature (° C.) | 50 | 50 | 50 | 50 | 50 | 50 | 50 |
| | | | reaction pressure (atm) | ordinary pressure | ordinary pressure | ordinary pressure | ordinary pressure | ordinary pressure | ordinary pressure | ordinary pressure |
| | | | reaction time (min) | 90 | 90 | 90 | 90 | 90 | 90 | 90 |
| | | | yield as an amount (g) | 60 | 60 | 60 | 60 | 60 | 60 | 60 |
| | | | yield as a percentage (%) | 100 | 100 | 100 | 100 | 100 | 100 | 100 |
| | | | activity (kg/mol · time) | 1930 | 1930 | 1930 | 2667 | 1930 | 1800 | 1800 |

TABLE 3-continued

| | | isoprene-butadiene random copolymer | polymer CA | polymer CB | polymer CC | polymer CD | polymer CE | polymer CF | polymer CG |
|---|---|---|---|---|---|---|---|---|---|
| results of analyzing isoprene-butadiene random copolymer | | cis-1,4-bond content of portion derived from isoprene (%) | 98.5 | 98.5 | 98.5 | 98.5 | 98.3 | 98.2 | 98.3 |
| | | 3,4-vinyl bond content of portion derived from isoprene (%) | 1.5 | 1.5 | 1.5 | 1.5 | 1.7 | 1.8 | 1.7 |
| | | cis-1,4-bond content of portion derived from butadiene (%) | 99 | 99.1 | 99.2 | 99 | 98.5 | 98 | 98.2 |
| | | vinyl bond content of portion derived from butadiene (%) | 0.3 | 0.2 | 0.3 | 0.4 | 0.2 | 0.3 | 0.2 |
| | | number-average molecular weight (×10³) (Mn) | 1140 | 1020 | 1160 | 1000 | 1110 | 980 | 960 |
| | | molecular weight distribution (Mw/Mn) | 2.5 | 2.3 | 2.6 | 2.3 | 2.4 | 2.8 | 2.8 |

| | | | Example C8 | Example C9 | Comparative Example C1 | Comparative Example C2 | Example C10 | Example C11 | Example C12 |
|---|---|---|---|---|---|---|---|---|---|
| specifications of method for manufacturing an isoprene-butadiene random copolymer | monomer preparation process | ratio of isoprene to 1,3-butadiene (mass) | 50/50 | 50/50 | 50/50 | 50/50 | 50/50 | 50/50 | 50/50 |
| | catalyst system preparation process polymerization catalyst composition | component (A) rare earth element compound including at least one nitrogen atom | Gd (*1) | Nd (*3) | Gd (*1) | Gd(In) (*2) | Gd (*1) | Gd (*1) | Gd (*1) |
| | | component (B) compound having a cyclopentadiene skeleton | indene | 3-benzyl-indene | — | — | 3-benzyl-indene | 3-benzyl-indene | 3-benzyl-indene |
| | | component (C) organometallic compound | diisobutyl aluminum hydride | diisobutyl aluminum hydride | diisobutyl aluminum hydride | diisobutyl aluminum hydride | diisobutyl aluminum hydride | diisobutyl aluminum hydride | diisobutyl aluminum hydride |
| | | component (D) aluminoxane compound | MMAO | MMAO | MMAO | MMAO | PMAO | MMAO | MMAO |
| | | component (E) halogen compound | diethyl aluminum chloride | diethyl aluminum chloride | diethyl aluminum chloride | diethyl aluminum chloride | diethyl aluminum chloride | — | diethyl aluminum chloride |
| | | ratio of component (B) to component (A) (mol) | 2 | 2 | 2 | 2 | 2 | 2 | 2 |
| | | ratio of component (C) to component (A) (mol) | 10 | 10 | 10 | 10 | 10 | 10 | 10 |
| | | ratio of aluminum in component (D) to rare earth element in component (A) (mol) | 100 | 100 | 100 | 100 | 100 | 100 | 100 |
| | | ratio of component (E) to component (A) (mol) | 2 | 2 | 2 | 2 | 2 | — | 0.5 |
| | copolymerization reaction process | solvent | hexane | hexane | hexane | hexane | hexane | hexane | hexane |
| | | reaction system | homogeneous | homogeneous | homogeneous | inhomogeneous | homogeneous | homogeneous | homogeneous |
| | | amount of catalyst (component (A) (mmol) in 100 g of first monomer) | 0.05 | 0.1 | 0.05 | 0.1 | 0.1 | 0.05 | 0.05 |
| | | reaction temperature (° C.) | 50 | 50 | 50 | 50 | 50 | 50 | 50 |
| | | reaction pressure (atm) | ordinary pressure | ordinary pressure | ordinary pressure | ordinary pressure | ordinary pressure | ordinary pressure | ordinary pressure |
| | | reaction time (min) | 90 | 90 | 90 | 90 | 90 | 90 | 90 |
| | | yield as an amount (g) | 60 | 60 | 60 | 0 | 60 | 60 | 60 |
| | | yield as a percentage (%) | 100 | 100 | 100 | 0 | 100 | 100 | 100 |
| | | activity (kg/mol · time) | 1750 | 280 | 300 | — | 130 | 300 | 500 |
| | | isoprene-butadiene random copolymer | polymer CH | polymer CI | polymer CJ | — | polymer CL | polymer CM | polymer CN |
| results of analyzing isoprene-butadiene random copolymer | | cis-1,4-bond content of portion derived from isoprene (%) | 98 | 96.8 | 97 | ND. | 98 | 97 | 98 |
| | | 3,4-vinyl bond content of portion derived from isoprene (%) | 2 | 2.4 | 3 | ND. | 2 | 3 | 2 |
| | | cis-1,4-bond content of portion derived from butadiene (%) | 98 | 94.2 | 98 | ND. | 98.8 | 97 | 97.8 |
| | | vinyl bond content of portion derived from butadiene (%) | 0.5 | 0.4 | 1 | ND. | 0.3 | 1 | 0.6 |
| | | number-average molecular weight (×10³) (Mn) | 950 | 500 | 900 | ND. | 920 | 300 | 600 |
| | | molecular weight distribution (Mw/Mn) | 2.8 | 2.5 | 3 | ND. | 2.6 | 6 | 2.8 |

TABLE 3-continued

| | | | | Example C13 | Example C14 | Example C15 |
|---|---|---|---|---|---|---|
| specifications of method for manufacturing an isoprene-butadiene random copolymer | monomer preparation process | | ratio of isoprene to 1,3-butadiene (mass) | 50/50 | 50/50 | 50/50 |
| | catalyst system preparation process polymerization catalyst composition | component (A) | rare earth element compound including at least one nitrogen atom | Gd (*1) | Gd (*1) | Gd (*1) |
| | | component (B) | compound having a cyclopentadiene skeleton | 3-benzyl-indene | 3-benzyl-indene | 3-benzyl-indene |
| | | component (C) | organometallic compound | diisobutyl aluminum hydride | diisobutyl aluminum hydride | diisobutyl aluminum hydride |
| | | component (D) | aluminoxane compound | MMAO | MMAO | MMAO |
| | | component (E) | halogen compound | diethyl aluminum chloride | diethyl aluminum chloride | diethyl aluminum chloride |
| | | | ratio of component (B) to component (A) (mol) | 2 | 2 | 2 |
| | | | ratio of component (C) to component (A) (mol) | 10 | 10 | 10 |
| | | | ratio of aluminum in component (D) to rare earth element in component (A) (mol) | 100 | 100 | 100 |
| | | | ratio of component (E) to component (A) (mol) | 1 | 10 | 20 |
| | copolymerization reaction process | | solvent | hexane | hexane | hexane |
| | | | reaction system | homogeneous | homogeneous | homogeneous |
| | | | amount of catalyst (component (A) (mmol) in 100 g of first monomer) | 0.05 | 0.05 | 0.05 |
| | | | reaction temperature (° C.) | 50 | 50 | 50 |
| | | | reaction pressure (atm) | ordinary pressure | ordinary pressure | ordinary pressure |
| | | | reaction time (min) | 90 | 90 | 90 |
| | | | yield as an amount (g) | 60 | 0 | 0 |
| | | | yield as a percentage (%) | 100 | 0 | 0 |
| | | | activity (kg/mol · time) | 550 | — | — |
| | | | isoprene-butadiene random copolymer | polymer CO | — | — |
| results of analyzing isoprene-butadiene random copolymer | | | cis-1,4-bond content of portion derived from isoprene (%) | 98 | ND. | ND. |
| | | | 3,4-vinyl bond content of portion derived from isoprene (%) | 2 | ND. | ND. |
| | | | cis-1,4-bond content of portion derived from butadiene (%) | 97.9 | ND. | ND. |
| | | | vinyl bond content of portion derived from butadiene (%) | 0.5 | ND. | ND. |
| | | | number-average molecular weight (×10$^3$) (Mn) | 720 | ND. | ND. |
| | | | molecular weight distribution (Mw/Mn) | 2.8 | ND. | ND. |

*1: trisbistrimethylsilylamide gadolinium
*2: bis(2-phenylindenyl)gadolinium bis(dimethylsilylamide)
*3: Neodymium Versatate
*4: bis(2-diphenylphosphinophenyl)amine A comparison between Examples C1 to C15 and Comparative Examples C1 and C2 shows that with the method for manufacturing an isoprene-butadiene random copolymer of this disclosure, an isoprene-butadiene random copolymer can be manufactured while reducing the burden on the environment and manufacturing costs.

In particular, a comparison between Example C1 and Comparative Example C1 shows that with the method for manufacturing of this disclosure, the effect of increasing the catalytic activity in the reaction system and the effect of increasing the cis-1,4-bond content are obtained. A comparison between Example C1 and Comparative Example C2 shows that with the method for manufacturing of this disclosure, an aromatic hydrocarbon that is poisonous and relatively expensive is not absolutely necessary as the solvent of the polymerization reaction, and the effect of reducing the burden on the environment and manufacturing costs can be obtained.

INDUSTRIAL APPLICABILITY

According to the method for manufacturing a conjugated diene polymer of this disclosure, the burden on the environment and manufacturing costs can be reduced. Also, with the conjugated diene polymer of this disclosure, a conjugated diene polymer having an extremely high cis-1,4-bond content can be provided. Furthermore, the rubber composition of this disclosure can achieve the effects of the conjugated diene polymer of this disclosure. Also, the tire of this disclosure can achieve the effects of the conjugated diene polymer of this disclosure.

According to the method for manufacturing a conjugated diene polymer of this disclosure, in particular an isoprene-butadiene block copolymer and an isoprene-butadiene random copolymer can suitably be manufactured.

The invention claimed is:

1. A method for manufacturing a conjugated diene polymer, the method comprising:
polymerizing a conjugated diene monomer using a polymerization catalyst composition comprising a rare earth element compound and a compound having at least one cyclopentadiene skeleton selected from the group consisting of substituted or unsubstituted cyclopentadiene, substituted or unsubstituted indene, and substituted or unsubstituted fluorene; and a halogen compound.

2. The method for manufacturing a conjugated diene polymer of claim 1, wherein the rare earth element compound is represented by Formula (1)

$$M\text{-}(AQ^1)(AQ^2)(AQ^3) \quad (1)$$

where M represents at least one element selected from the group consisting of scandium, yttrium, and a lanthanoid element; $AQ^1$, $AQ^2$, and $AQ^3$ are each a different or identical functional group; A represents at least one selected from the group consisting of nitrogen, oxygen, and sulfur; and the rare earth element compound comprises at least one M-A bond.

3. The method for manufacturing a conjugated diene polymer of claim 1, wherein the polymerization catalyst composition further comprises an organometallic compound represented by Formula (2)

$$YR^1_a R^2_b R^3_c \quad (2)$$

where Y is a metal element selected from the group consisting of Group 1, Group 2, Group 12, and Group 13 of the periodic table; $R^1$ and $R^2$ are each a hydrogen atom or a hydrocarbon group having 1 to 10 carbon atoms; $R^3$ is a hydrocarbon group having 1 to 10 carbon atoms; $R^1$, $R^2$, and $R^3$ are identical to or different from each other; a is 1 and b and c are both 0 when Y is a metal element of Group 1; a and b are 1 and c is 0 when Y is a metal element of Group 2 or Group 12; and a, b, and c are all 1 when Y is a metal element of Group 13.

4. The method for manufacturing a conjugated diene polymer of claim 3, wherein in Formula (2), at least one of $R^1$, $R^2$, and $R^3$ is different.

5. The method for manufacturing a conjugated diene polymer of claim 1, wherein the compound having the cyclopentadiene skeleton is substituted or unsubstituted indene.

6. The method for manufacturing a conjugated diene polymer of claim 1, wherein the polymerization catalyst composition further comprises an aluminoxane compound.

7. The method for manufacturing a conjugated diene polymer of claim 6, wherein the aluminoxane compound is MMAO or TMAO wherein
the MMAO is represented by Formula (6);

$$-(Al(CH_3)_{0.7}(i\text{-}C_4H_9)_{0.3})_k- \quad (6)$$

where in Formula (6), k is 5 or more, and
the TMAO is represented by Formula (5);

$$-(Al(CH_3)_x(i\text{-}C_4H_9)_y O)_m- \quad (5);$$

where in Formula (5), x+y is 1, and m is 5 or more.

8. The method for manufacturing a conjugated diene polymer of claim 1, wherein a ratio in moles of the halogen compound to the rare earth element compound is from 1.0 to 10.

9. The method for manufacturing a conjugated diene polymer of claim 1, wherein the polymerization catalyst composition does not comprise an aromatic hydrocarbon.

10. The method for manufacturing a conjugated diene polymer of claim 1, wherein the conjugated diene monomer is selected from the group consisting of isoprene, and 1,3-butadiene, and a combination thereof.

* * * * *